(12) United States Patent
Dean et al.

(10) Patent No.: US 7,590,383 B2
(45) Date of Patent: Sep. 15, 2009

(54) DETERMINING MOBILE STATION POSITION USING BASE STATION IDENTIFICATION AND A REPEATER DISCRIMINANT

(75) Inventors: Richard Finch Dean, Lyons, CO (US); Kenneth Robert Baker, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 771 days.

(21) Appl. No.: 11/033,597

(22) Filed: Jan. 11, 2005

(65) Prior Publication Data

US 2005/0130672 A1      Jun. 16, 2005

Related U.S. Application Data

(63) Continuation-in-part of application No. 10/004,177, filed on Oct. 25, 2001, now abandoned, and a continuation-in-part of application No. 10/316,780, filed on Dec. 10, 2002, now Pat. No. 7,062,224.

(51) Int. Cl.
H04B 1/60 (2006.01)
H04B 7/14 (2006.01)
H04W 24/00 (2009.01)
H04W 64/00 (2009.01)

(52) U.S. Cl. .................... 455/9; 455/15; 455/456.1; 370/315

(58) Field of Classification Search ............ 455/7, 455/9, 23, 11.1, 18, 15, 16, 24, 456.1, 456.5, 455/456.6; 342/450; 370/315, 522
See application file for complete search history.

(56) References Cited

U.S. PATENT DOCUMENTS

| | | | |
|---|---|---|---|
| 3,670,249 A | * | 6/1972 | Meslener .................. 341/72 |
| 4,993,021 A | | 2/1991 | Nannicini et al. |
| 5,056,109 A | | 10/1991 | Gilhousen et al. |
| 5,210,632 A | | 5/1993 | Murakami et al. |
| 5,440,418 A | | 8/1995 | Ishimura et al. |
| 5,910,943 A | | 6/1999 | Wickman |
| 6,501,955 B1 | | 12/2002 | Durrant et al. |
| 2002/0115448 A1 | | 8/2002 | Amerga et al. |

(Continued)

FOREIGN PATENT DOCUMENTS

EP     0840533     5/1998

(Continued)

OTHER PUBLICATIONS

International Search Report—PCT/US06/001286, International Search Authority—European Patent Office, May 31, 2006.

(Continued)

Primary Examiner—Philip J Sobutka
(74) Attorney, Agent, or Firm—Richard A. Bachand; Linda G. Gunderson

(57) ABSTRACT

A method and system determines mobile station position information based upon base station identification and a repeater discriminant. A position location database includes base station identifications and repeater discriminant combinations, and unique position information associated with each combination. A repeater implements a discriminant to a transmitted signal in either the forward link, reverse link, or both. The position location database is accessed to determine mobile station position information based upon a base station identification and repeater discriminant.

19 Claims, 15 Drawing Sheets

U.S. PATENT DOCUMENTS

Figure 1:
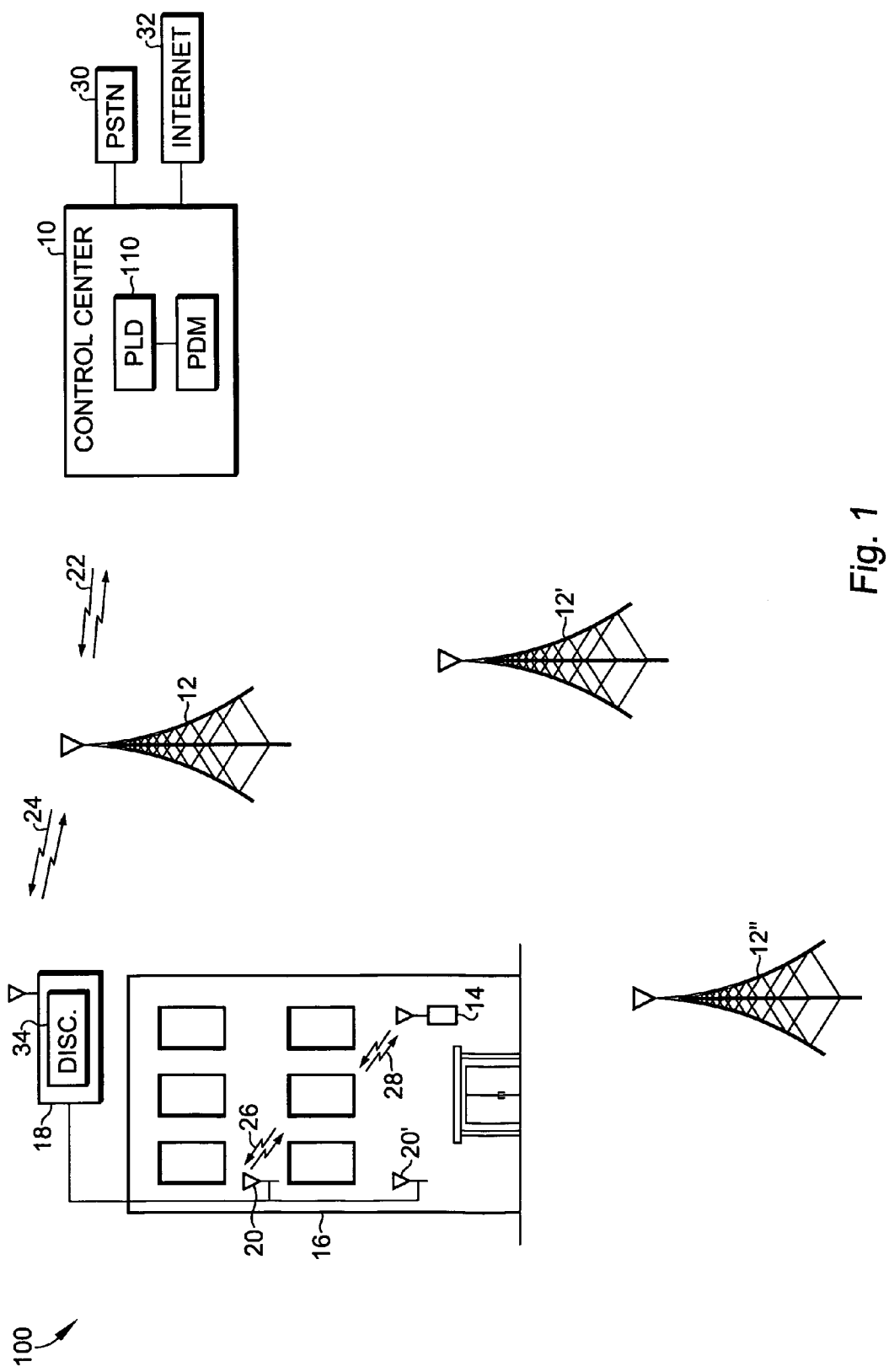

| | | |
|---|---|---|
| 2003/0083008 A1 | 5/2003 | Baker et al. |
| 2003/0162550 A1 | 8/2003 | Kuwahara et al. |
| 2003/0220075 A1 | 11/2003 | Baker et al. |
| 2004/0097190 A1* | 5/2004 | Durrant et al. .................. 455/7 |

FOREIGN PATENT DOCUMENTS

| | | |
|---|---|---|
| EP | 0851695 | 7/1998 |
| EP | 0935356 | 8/1999 |
| EP | 1093273 | 4/2001 |
| GB | 2378614 A | 2/2003 |
| WO | 0199444 | 12/2001 |
| WO | 0217669 | 2/2002 |
| WO | 02087275 A2 | 10/2002 |
| WO | 2004095733 A2 | 11/2004 |

OTHER PUBLICATIONS

Written Opinion—PCT/US06/001286, International Search Authority—European Patent Office, May 31, 2006.

International Preliminary Report on Patentability—PCT/US06/001286, International Bureau of WIPO—Geneva, Switzerland, Jul. 17, 2007.

Simon, et al., "Spread Spectrum Communications Handbook," Revised Edition, McGraw-Hill, 1994, ISBN 0-07-057629-7, pp. 11-12.

* cited by examiner

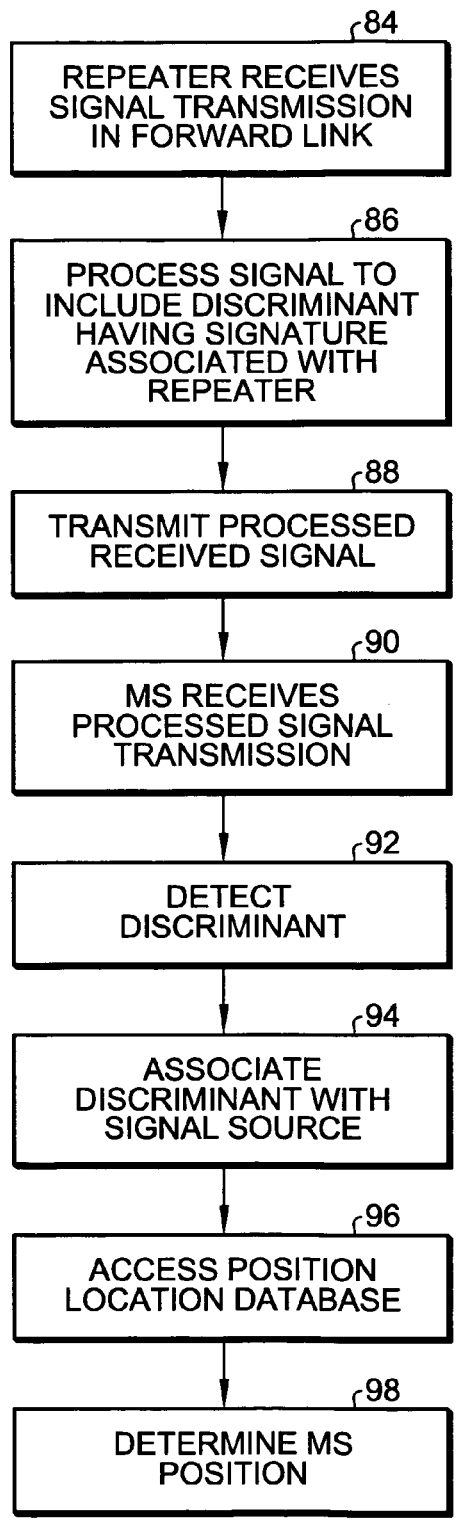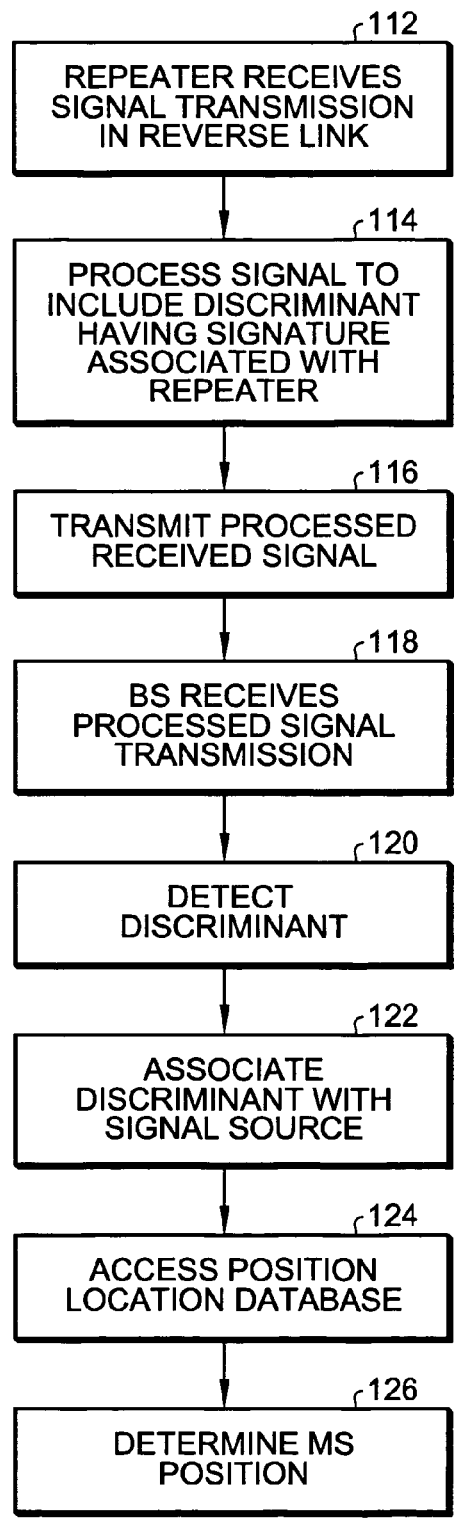
Fig. 6A
Fig. 6B

DETERMINING MOBILE STATION POSITION USING BASE STATION IDENTIFICATION AND A REPEATER DISCRIMINANT

CROSS-REFERENCE TO RELATED APPLICATIONS

This application is a continuation-in-part of U.S. patent application Ser. No. 10/004,177 entitled, "Method and System for Identifying Repeater Traffic in a Code Division Multiple Access System," filed on Oct. 25, 2001, now abandoned and claims the benefit of the filing date thereof.

This application is also a continuation-in-part of U.S. patent application Ser. No. 10/316,780 entitled, "Method and System for Identifying and Monitoring Repeater Traffic in a Code Division Multiple Access System," filed on Dec. 10, 2002, now U.S. Pat. No. 7,062 224 and claims the benefit of the filing date thereof.

BACKGROUND

1. Field

The method and system herein relates to communication systems, and more specifically to a method and system for determining the position of a mobile station based upon base station identification and a repeater discriminant.

2. Related Art

The communications field requires accurate position information in many instances for mobile stations (MSs) such as cellular telephones, personal communication system (PCS) devices, and other user equipment (UE). Global Positioning Systems (GPS) offer an approach to providing wireless MS position determination. These systems employ satellite vehicles (SVs) in orbit around the earth. A GPS user can derive precise navigation information including three-dimensional position, velocity and time of day through information gained from the SVs.

An example of a wireless position location system is an MS with a GPS receiver, communicating with one or more base stations (BSs) in communication with a core communication network. The MS also communicates with a position determination module (PDM), also referred to as a position determination entity (PDE), that provides an estimated position of the MS and SV signal acquisition assistance data to the MS, among other functions. Typically signal acquisition assistance data is derived from the PDM's best understanding of where the MS is currently located and the MS clock state at that time.

One way in which the PDM determines a location estimate for the MS is through network-based range measurements. Network-based range measurements, also known as pilot phase measurements (PPMs), or advanced forward link trilateration (AFLT) measurements in IS-95 and IS-2000 communication networks, are range measurements to a cell tower antenna. Range measurements can be useful in determining a reasonably accurate position and clock state for the MS. It is possible, however, that range measurements are skewed by signal time delay encountered at a repeater located in the transmission path between a base station and MS used to amplify signals transmitted in both the forward and reverse links. This time delay may, for example, delay PDM location algorithms from converging on a position solution, produce an error in position solution, or prevent the PDM from arriving at a position solution.

Regardless of whether MS position is determined through range measurements, global positioning, or a combination of both, position solutions can be especially difficult or impossible when the MS is located within a structure, for example, a building made of concrete, steel and low-emissivity glass, a tunnel, within a canyon, or the like, due to the difficulty in receiving and transmitting an adequate number of range signals or receiving positioning signals from a global positioning system. Even with a repeater located at or near the structure, obtaining a position solution for a MS located within the structure may be difficult.

A need exists for a method and system that improves position solutions for mobile stations located within a structure, for mobile stations having difficulty in receiving and transmitting ranging signals, or for receiving positioning signals from a global positioning system.

SUMMARY

One way of accounting for the error in a position solution when a repeater is in the transmission path is through the addition, or deletion, of a discriminant in the transmitted signal at the repeater. A "discriminant" is a characteristic of a repeater signal from which the repeater can be identified. The discriminant can take many different forms. It may be, for example, a code that is added to the repeater signal. Alternatively, it may be a modulation that is applied to the signal received at the repeater from a remote station to be rebroadcast by the repeater. The modulation may be, for instance, amplitude modulation (AM), frequency modulation (FM), pulse modulation (PM), delay modulation (DM), or combination thereof. It may be a signal characteristic that augments or is added to the repeater signal, or it may be a characteristic such as the absence of modulation or the absence of some attribute the repeater signal is expected to have. Other discriminant embodiments are described in further detail hereinafter.

If the repeater transmits a discriminant, the receiver of the transmitted signal may then identify the discriminant as being associated with a particular repeater. Such methods and systems are described in U.S. patent application Ser. No. 10/004, 177 entitled, "Method and System for Identifying Repeater Traffic in a Code Division Multiple Access System," and U.S. patent application Ser. No. 10/316,780 entitled, "Method and System for Identifying and Monitoring Repeater Traffic in a Code Division Multiple Access System." Knowing the identity of the repeater then allows the system to determine and/or adjust the position solution accordingly.

More particularly, the method and system herein includes a position location database of base station identifications and repeater-discriminant combinations, and unique position information associated with each combination. Advantageously, the method and system determines receiver position information in a communication system using the database.

When implemented in the forward link, a repeater processes a received signal transmission to implement a discriminant to the signal, and transmits the processed signal. The transmitted signal is received by a mobile station, which detects the discriminant and associates the discriminant with a particular signal source. Mobile station receiver position information is then determined based upon the discriminant and base station by accessing the position location database.

The method and system can alternatively be implemented in the reverse link, where a repeater processes a received signal transmission to implement a discriminant to the signal, and transmits the processed signal. The transmitted signal is received by a base station, which detects the discriminant and associates the discriminant with a particular signal source. Mobile station receiver position information is then determined based upon the discriminant and base station identification by accessing the position location database.

The method and system can further be implemented in both the forward and reverse links, whereby the repeater processes a received signal transmission to implement a discriminant to the signal in both the forward and reverse links. Advantageously, this method and system allows position confirmation.

The method described herein further includes creating a database of repeater discriminants, base station identifications, and associated position information; identifying a discriminant of a signal transmission; identifying a base station associated with a signal transmission; and accessing the database to determine position information associated with the identified discriminant and base station.

The system further includes a computer readable medium embodying at least one set of instructions executable by the computer to identify a discriminant of a transmitted signal; identify a base station associated with the transmitted signal; and determine position based upon the identified discriminant and base station. The system also includes a computer readable medium embodying a position location database of signal discriminants associated with repeaters of a communication system; base station identifications; and position information associated with the signal discriminants and base station identifications.

DRAWINGS

Embodiments of the disclosed method and apparatus are shown in the following figures, in which like reference numbers and designations indicate like or similar parts.

Figure 2A:
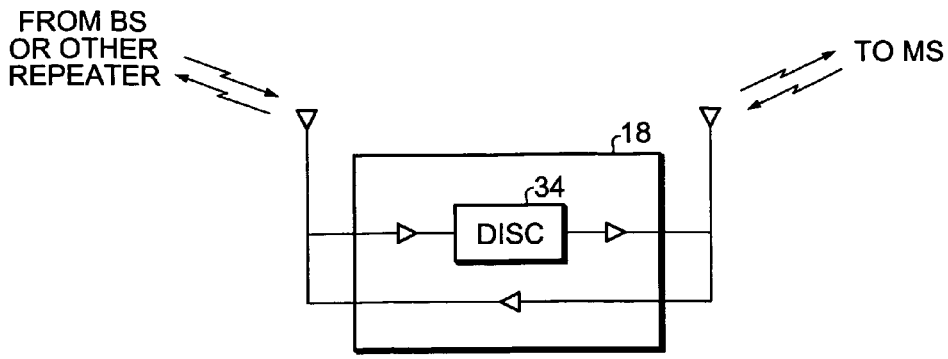
Figure 2B:
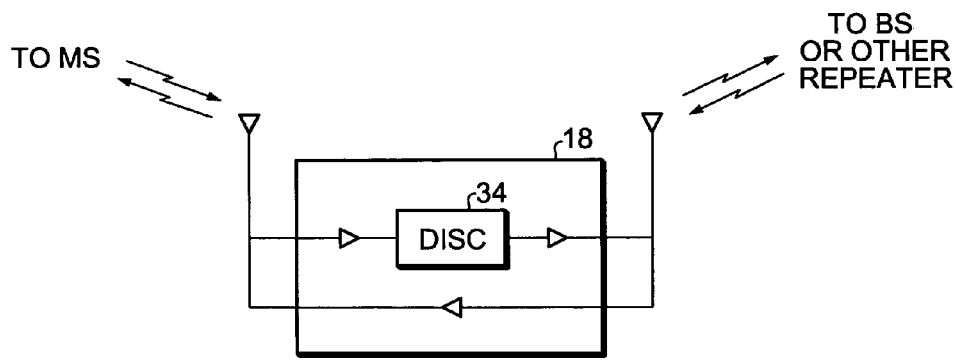
Figure 2C:
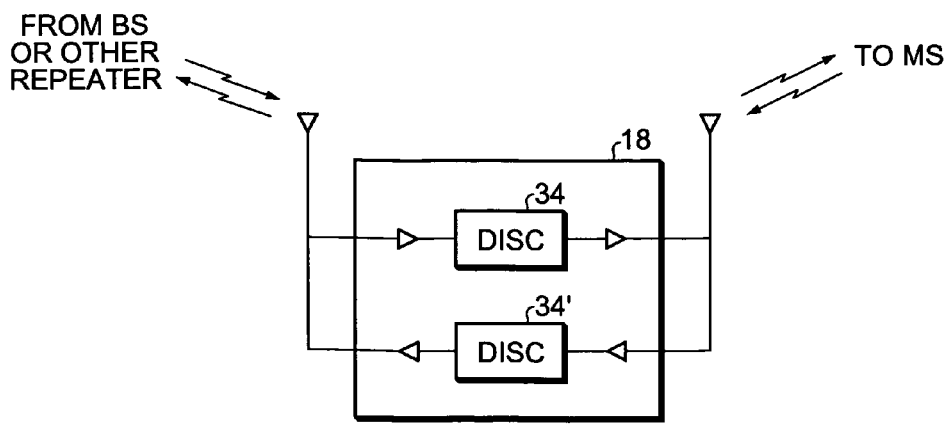
Figure 3:
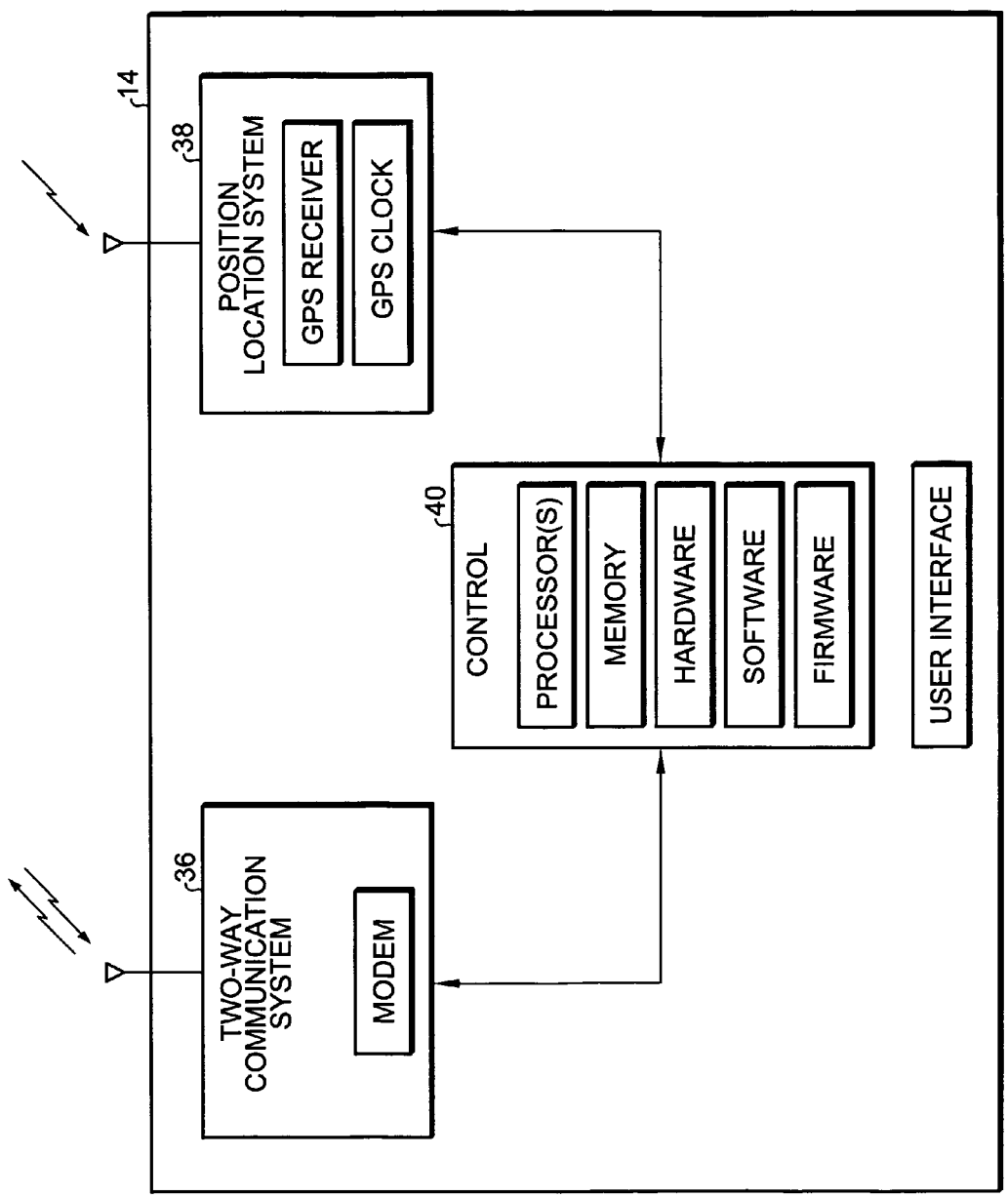
Figure 4A:
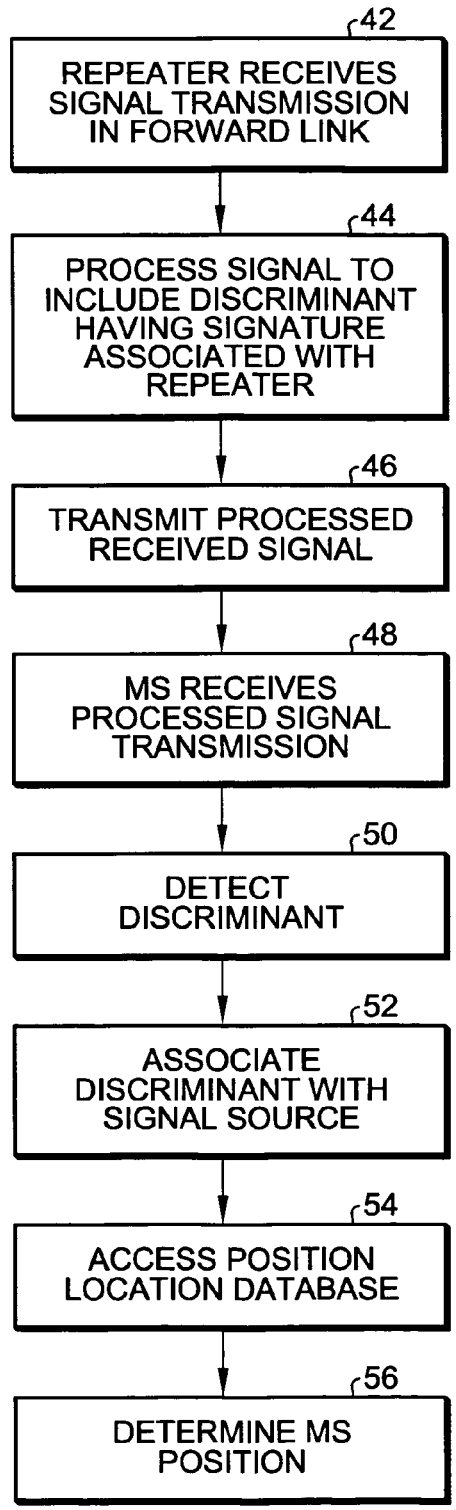
Figure 4B:
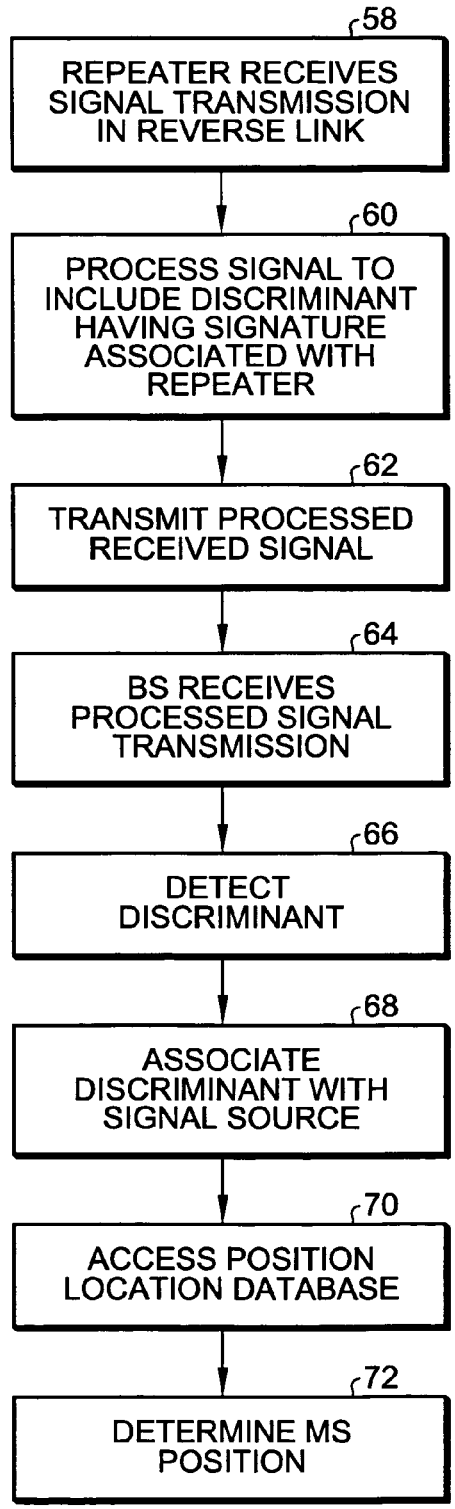
Figure 5:
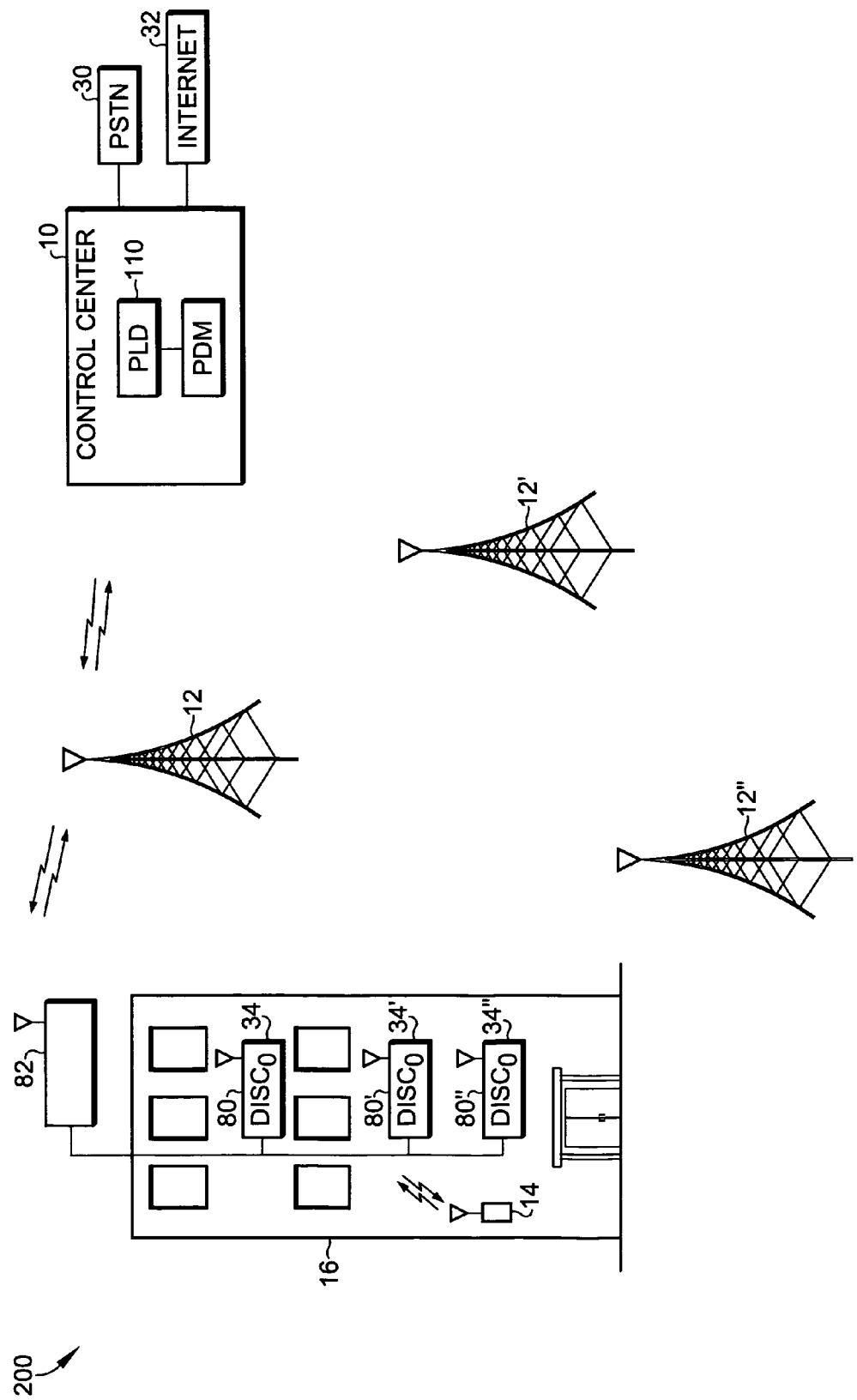
Figure 7:
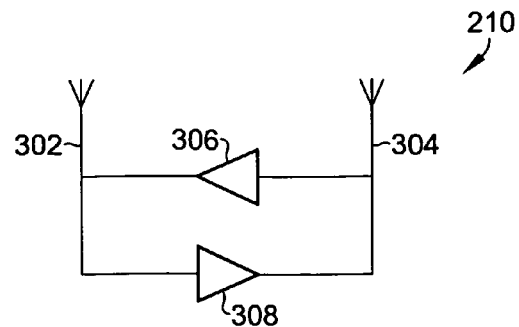
Figure 8:
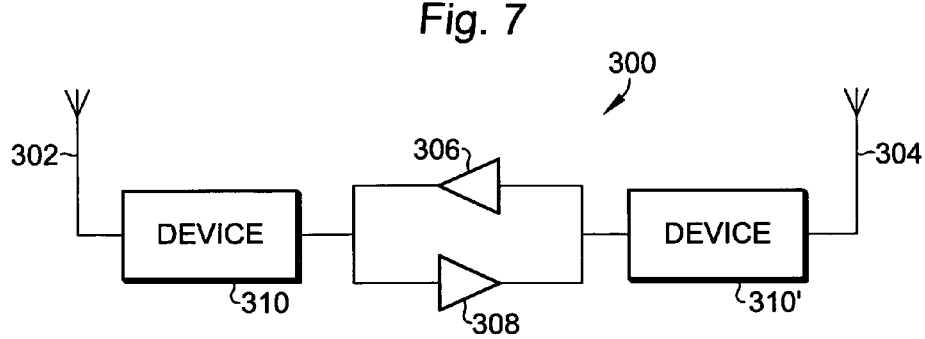
Figure 9:
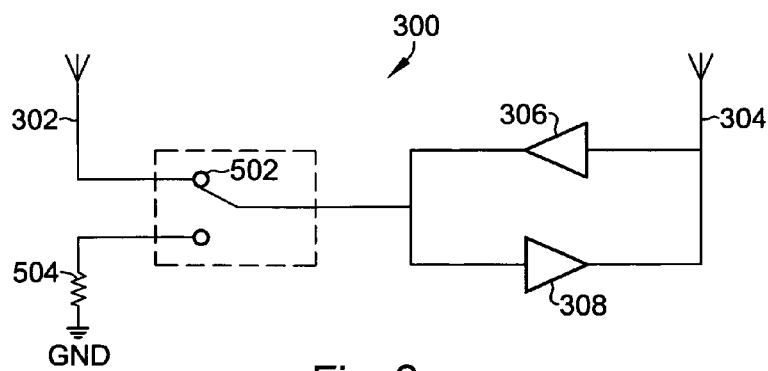
Figure 10:
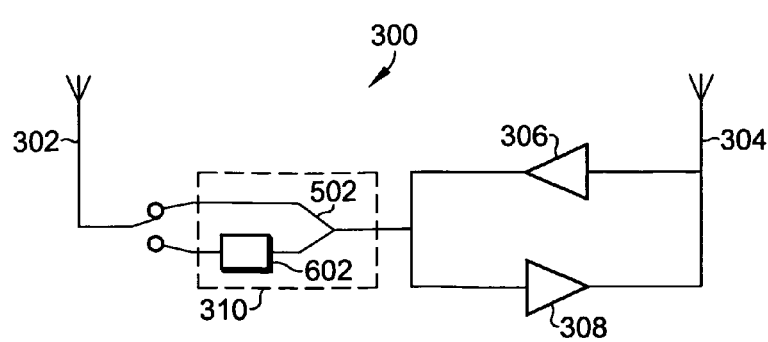
Figure 11:
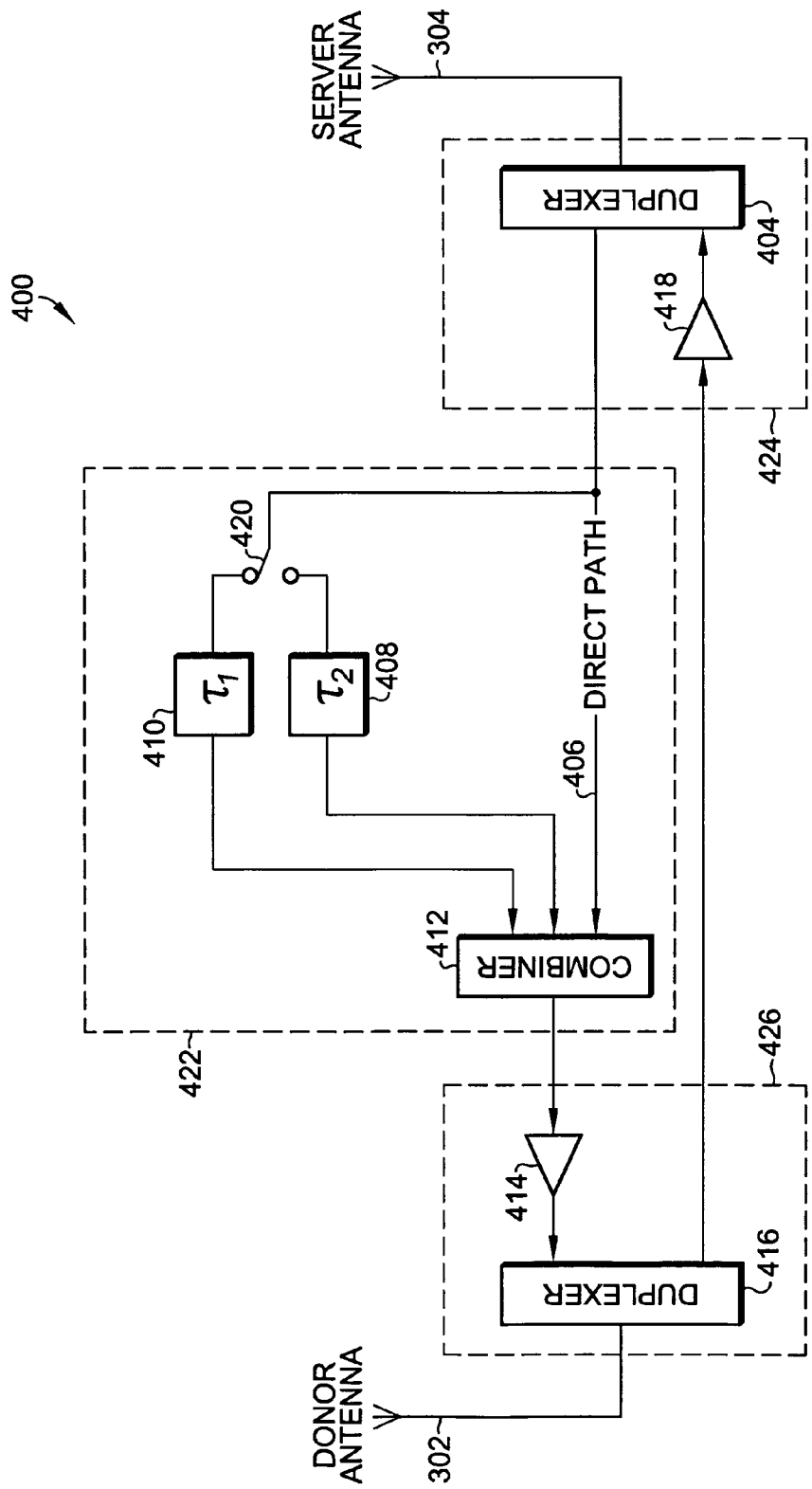
Figure 12:
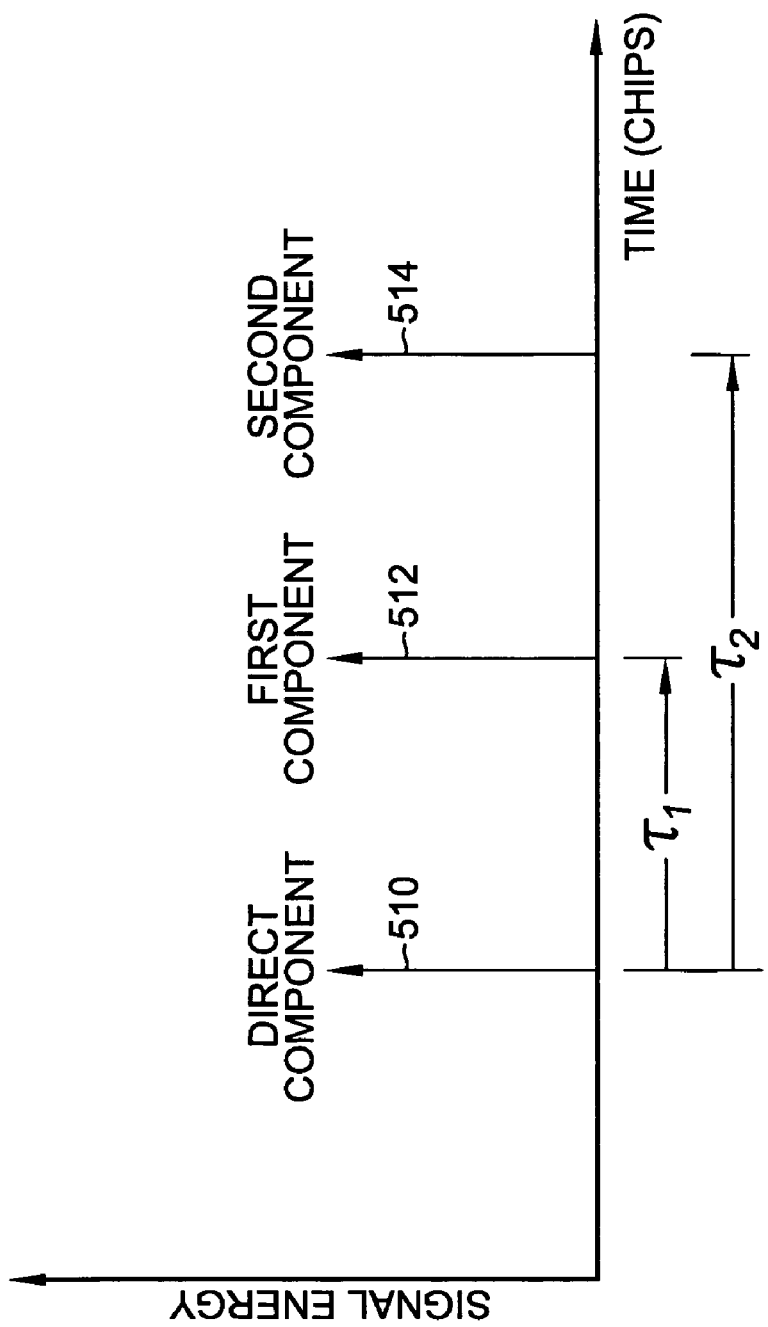
Figure 13:
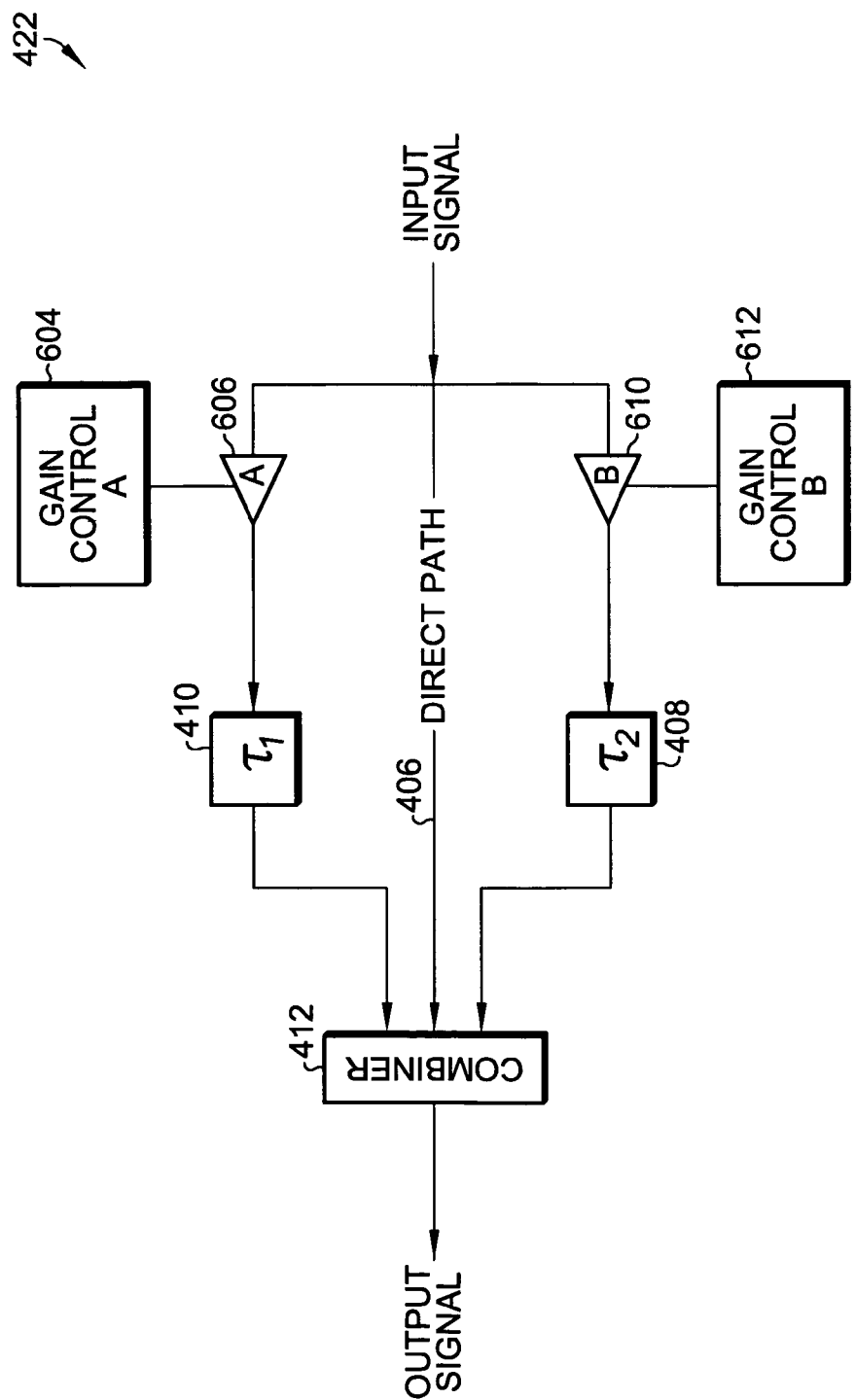
Figure 14:
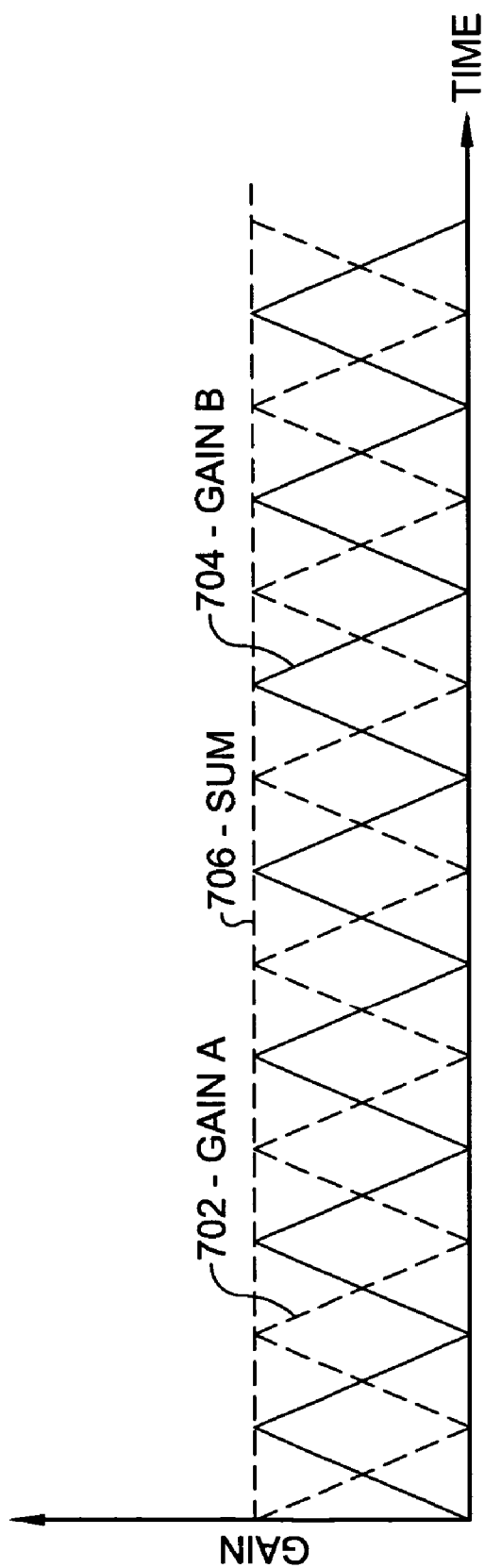
Figure 15:
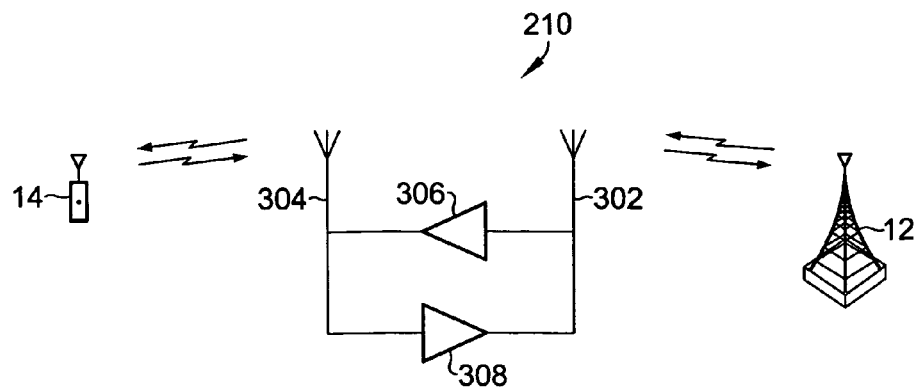
Figure 16:
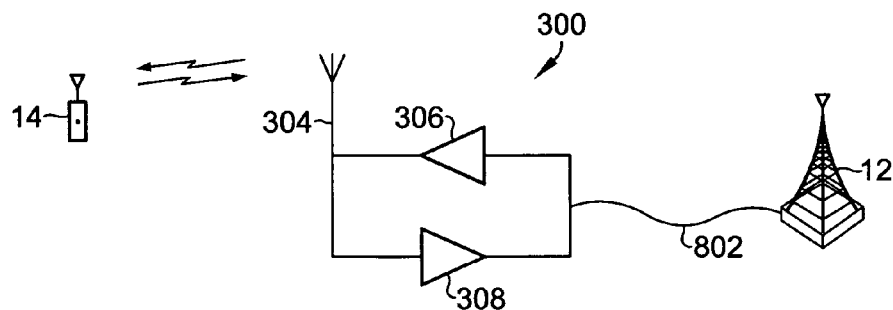
Figure 17:
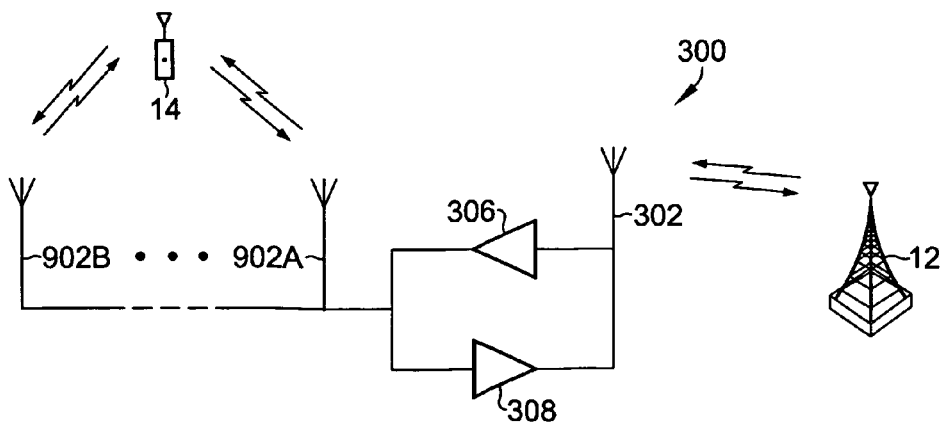
Figure 18:
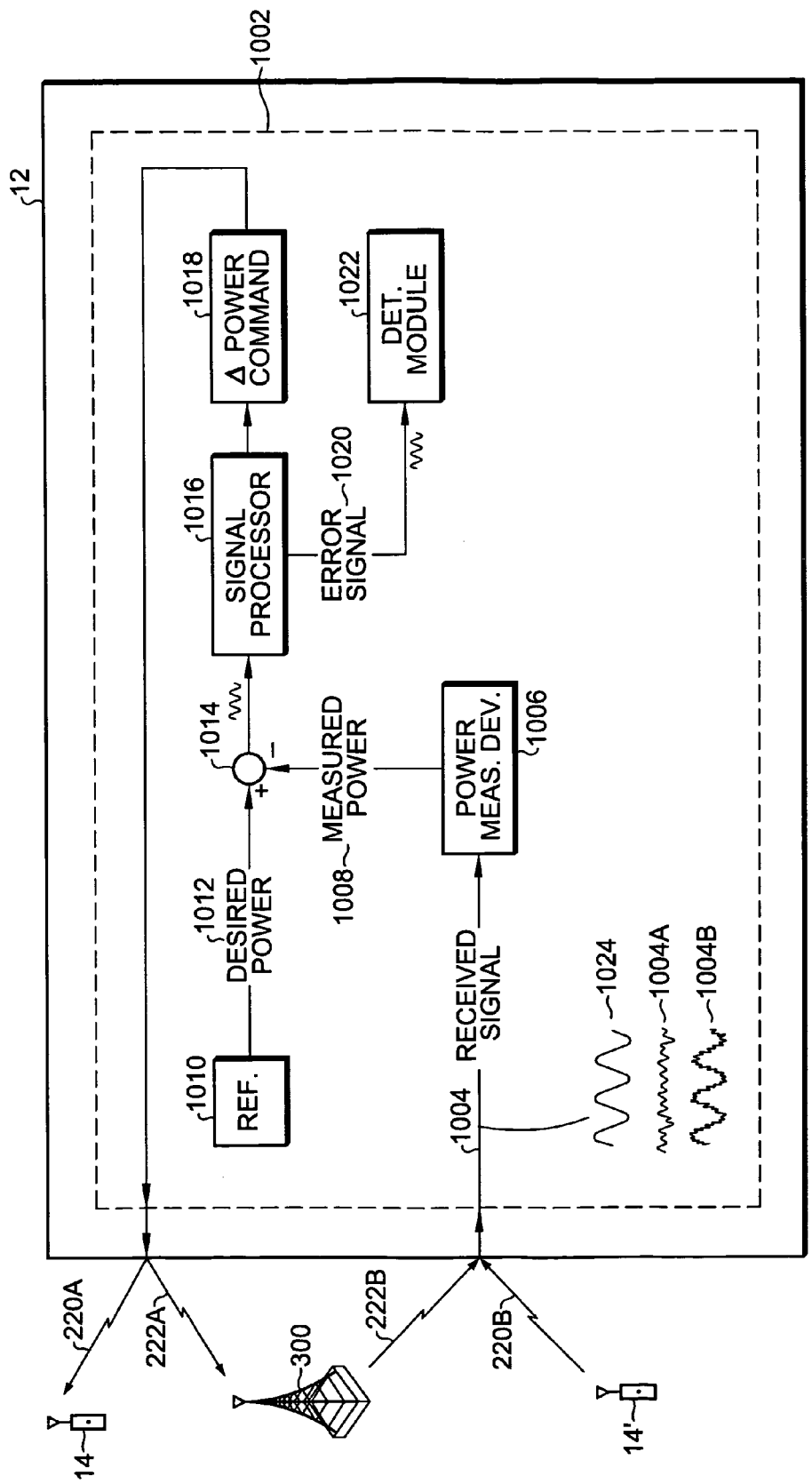
Figure 19:
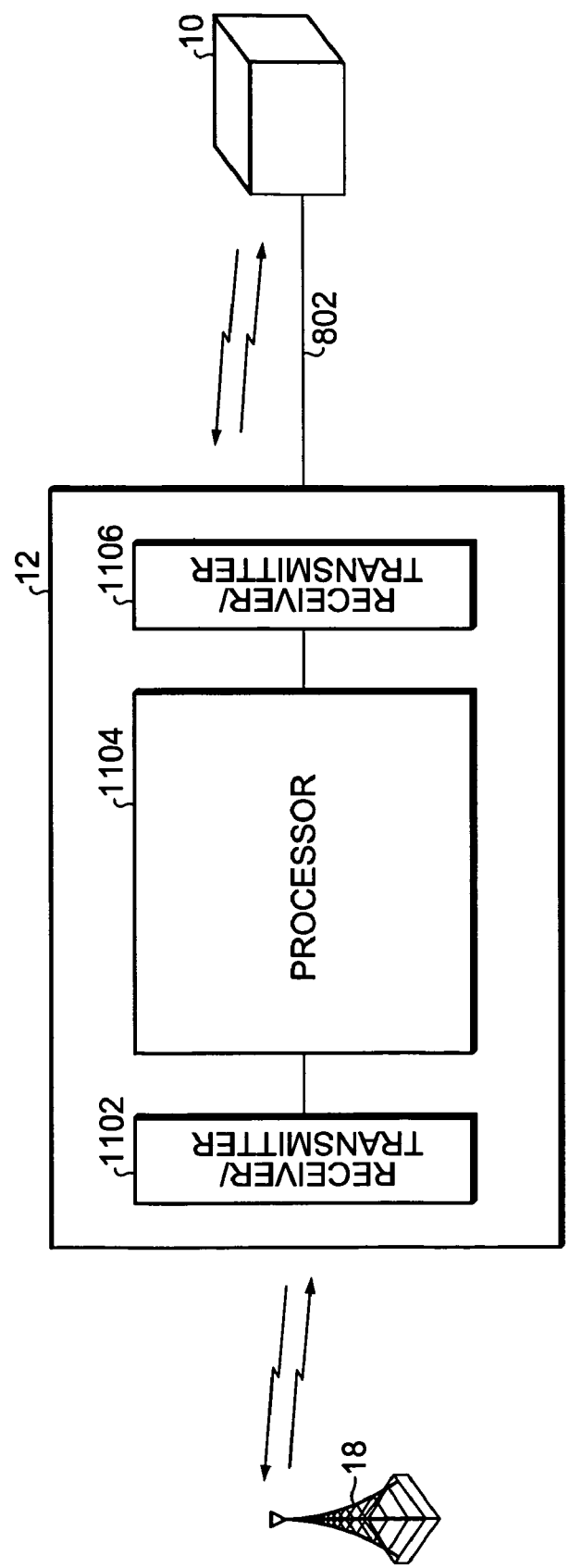
Figure 20:
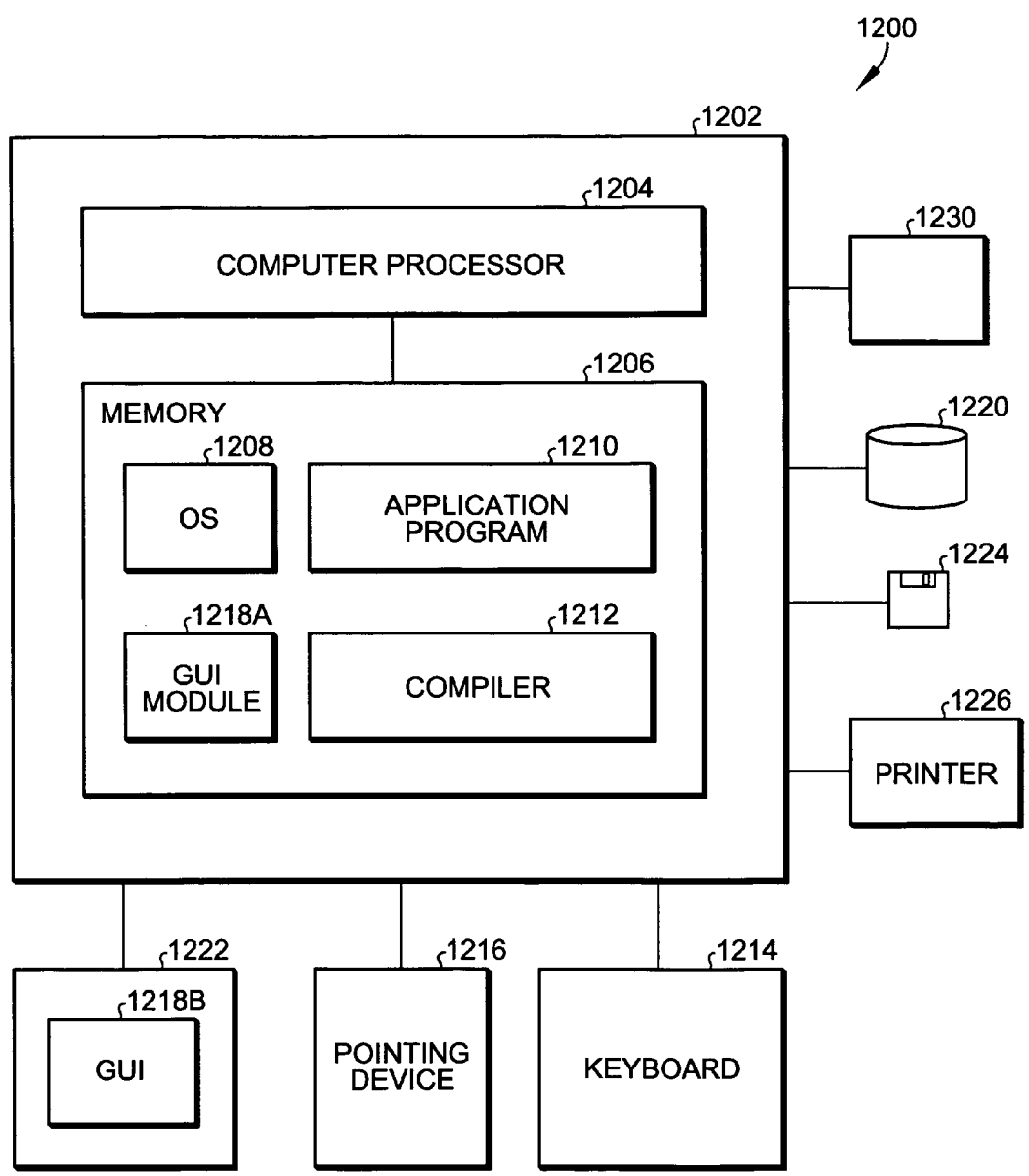

FIG. 1 illustrates a communication system with a repeater;

FIG. 2a provides a diagram of a repeater implementing a discriminant in the forward link;

FIG. 2b provides a diagram of a repeater implementing a discriminant in the reverse link;

FIG. 2c provides a diagram of a repeater implementing a discriminant in both the forward and reverse links;

FIG. 3 provides a diagram of a mobile station;

FIG. 4a provides an outline of a method of determining mobile station position utilizing a discriminant implemented at a repeater;

FIG. 4b provides an outline of another method of determining mobile station position utilizing a discriminant implemented at a repeater;

FIG. 5 illustrates a communication system with one or more repeaters;

FIG. 6a provides an outline of a method of determining mobile station position utilizing a discriminant implemented at a repeater in a region having one or more repeaters;

FIG. 6b provides an outline of another method of determining mobile station position utilizing a discriminant implemented at a repeater in a region having one or more repeaters;

FIG. 7 provides a block diagram of a repeater;

FIG. 8 provides a block diagram of an embodiment of a repeater in accordance with the method and system;

FIG. 9 provides a diagram presenting an implementation of the discriminant described herein employing AM modulation;

FIG. 10 provides a diagram presenting an implementation of the discriminant described herein employing delay modulation;

FIG. 11 provides a block diagram of another embodiment of a repeater in accordance with the method and system;

FIG. 12 provides a diagram illustrating one embodiment of a signal transmitted by the second transceiver depicted in FIG. 11;

FIG. 13 provides a diagram illustrating an alternative embodiment of the discriminant processor of FIG. 11;

FIG. 14 provides a diagram showing exemplary control signals provided by the gain controllers of FIG. 13;

FIG. 15 presents a basic repeater configuration with respect to the orientation relative to a mobile station, base station, and repeater;

FIG. 16 provides a diagram showing a repeater configuration in which the link from a repeater to a base station is accomplished via a landline;

FIG. 17 provides a diagram of a repeater configuration in which the server antenna is a plurality of antennae distributed in a plurality of locations;

FIG. 18 provides an embodiment of base station elements which distinguish signals received from the mobile station via a repeater from signals received directly of the base station;

FIG. 19 provides an embodiment of base station elements which distinguish signals received from the mobile station via a repeater from signals received directly from the remote station; and FIG. 20 provides a diagram illustrating a computer system that may be used to implement a processor and other elements of the method and system herein.

DETAILED DESCRIPTION

As used herein the term "mobile station" refers to a cellular telephone, personal communication system (PCS) device, other user equipment (UE), remote station, or any remotely located receiver in a communication system. The method and system described herein is applicable to communication systems, such as but not limited to wireless position location systems, utilizing any communication air interface.

Ranging signals are not limited to GPS satellite vehicle signals. For example, base station (BS) signals are commonly used for ranging, and the ranging signals need not be communication signals. Signals acquired for ranging purposes are not limited to Code Division Multiple Access (CDMA), Universal Mobile Telecommunications System (UMTS) or Global System for Mobile Communications (GSM) signals, but may include other types.

The term "computer", "processor", or "processing means" is used herein to refer generally to a programmable apparatus or terminal in communication with a programmable apparatus, programmable wireless handheld device such as a mobile station, base station, repeater, or server such as a PDM, having a processor or other equivalent hardware, as well known by those skilled in the art. Each "computer", "processor", or "processing means" referred to herein includes the necessary "computer-readable" media to perform the functions described herein, or is in communication with the necessary computer-readable media. The term "computer-readable medium" refers to any medium that participates in providing instructions to a processor for execution. As used herein, the term "code" and/or "software" refers to a set of instructions that are communicated to a processor.

"Computer readable media" may take many forms, including but not limited to, "non-volatile media", "volatile media". "Non-volatile media" includes, for example, optical or magnetic disks such as used for a storage medium. "Volatile media" includes, for example, dynamic memory. Common forms of "computer-readable media" include floppy disks, flexible disks, hard disks, magnetic tape, other magnetic mediums, CD-ROM or other optical medium, RAM, PROM, EPROM, FLASH EPROM, and other memory chips or cartridges, a carrier wave, or any medium from which a computer or processor can read. Databases, data, and/or records can be recorded or stored on computer readable media.

Each repeater, mobile station, base station, control center, and other components of the communication system described herein include the necessary processing means to perform the methods described herein.

"Computer readable media" may take many forms, including but not limited to, "non -volatile media", and "volatile media","Non-volatile media"includes, for example, optical or magnetic disks such as used for a storage medium. "Volatile media" includes, for example, dynamic memory. Common forms of "computer-readable media" include floppy disks, flexible disks, hard disks, magnetic tape, other magnetic mediums, CD-ROM or other optical medium, RAM, PROM, EPROM, FLASH EPROM, and other memory chips or cartridges, a carrier wave, or any medium from which a computer or processor can read. Databases, data, andlor records can be recorded or stored on computer readable media.

Referring to FIG. 1, a diagram illustrates an example of a communication system 100. The system includes one or more control centers 10, and a plurality of base stations 12, where each base station 12 communicates with mobile station receivers 14 that are within their respective service area. The service area of base station 12 is generally described as the geographical extent of a locus of points for which mobile station (MS) 14 can effectively communicate with base station 12. Multiple service areas typically overlap to provide service over a wide area. Thus a mobile station may be in communication with more than one base station, particularly if the mobile station is located outside in a region with ample reception.

In the example illustrated, mobile station 14 is shown located within structure 16 within the coverage area of a serving base station 12. Although represented as a building in the figures herein, structure 16 can include, but is not limited to, a building, tunnel, outdoor canyon, or any other signal-inhibiting mechanism or phenomena. However, because the signals transmitted to and from base station 12 may be unable to penetrate structure 16, a repeater 18 is placed in the signal path between base station 12 and MS 14, such as upon the roof of structure 16. Repeater 18 receives, amplifies, and transmits the communication signal in both the forward and reverse links between MS 14 and base station 12. Repeater 18 also implements discriminant 34, in either the forward or reverse link, having a signature associated with repeater 18 to the transmitted signal at repeater 18 so that a receiver can identify the discriminant as being associated with repeater 18 at a particular location. Due to the limitation on system resources there are a limited number of discriminants available for implementation at any given repeater. Therefore, a particular discriminant may be associated with more than one repeater. One or more antennas 20 within structure 16 further receive and transmit signals between repeater 18 and MS 14.

When MS 14 is in the service area of base station 12, messages can be transmitted between control center 10, base station 12, repeater 18, antennas 20, and MS 14 via forward and reverse links shown at 22, 24, 26, and 28. Link 22 typically consists of a cable or radio frequency link, such as one or more T1s or a T3. Link 24 typically consists of a radio frequency link. CDMA or other communication protocols are implemented in the appropriate links, as will be understood by those skilled in the art. The term "forward link," also referred to as "down link," conventionally refers to the signal path from a transmitter to an MS, such as from control center 10 to base station 12 to MS 14, while the term "reverse link," also referred to as "up link," or "return link," refers to the signal path in the opposite direction, such as from MS 14 to base station 12 to control center 10. Separate forward and reverse links allow full duplex communications between control center 10 and MS 14. Control center 10 is communicatively coupled to other communication portals such as public switched telephone network (PSTN) 30 or Internet 32 to enable MS 14 to communicate through these portals.

FIG. 2a provides a simplified diagram of repeater 18. As discussed, repeater 18 amplifies a signal transmitted between base station 12, or other repeater—if a repeater is encountered in the communication link between base station 12 and repeater 18—and MS 14 in both the forward and reverse links. Signal amplification provided by repeater 18 ranges from zero gain to an amount necessary to provide adequate signal strength at the receiver of MS 14 or BS 12. In FIG. 2a, repeater 18 also processes the signal to include discriminant 34 in the forward link. FIG. 2b provides an alternative diagram of repeater 18, where amplification is provided in both the forward and reverse links, and the signal is processed by repeater 18 to include discriminant 34 in the reverse link. FIG. 2c provides a diagram of repeater 18, which implements discriminants 34, 34' in both the forward and reverse links. In this embodiment discriminants 34 and 34' can either be the same discriminant or different discriminants.

The repeater discriminant 34 can be implemented in a variety of ways, such as but not limited to those described in co-pending U.S. patent application Ser. No. 10/004,177 entitled, "Method and System for Identifying Repeater Traffic in a Code Division Multiple Access System," and U.S. patent application Ser. No. 10/316,780 entitled, "Method and System for Identifying and Monitoring Repeater Traffic in a Code Division Multiple Access System." For example, the repeater discriminant could be a code or in-band tone added to or deleted from the transmitted signal; a frequency, amplitude or delay modulation applied to the signal; and/or power control information implemented at the repeater, as discussed below with reference to FIGS. 7 through 20.

Referring to FIG. 3, a diagram illustrates an example of MS 14 shown in FIG. 1. Mobile station 14 includes the appropriate hardware 36 for duplex communication, such as but not limited to a UMTS, CDMA, or GSM modem. Optionally a position location system 38 is included, such as but not limited to a GPS receiver and GPS clock. Programmable control 40, such as but not limited to one or more processors, one or more memories, hardware, software, and firmware, provides control and operation of MS 14. Programmable control 40 includes the appropriate computer readable media and suitable code for control and operation of MS 14.

Determination of relatively accurate, initial mobile station position requires a suitable number of range measurements, or reception of forward link base station identifications by MS 14 from a suitable number of base stations 12. However, in the communication system 100 shown in FIG. 1, MS 14 may only communicate through a single repeater 18 with few base stations 12 because MS 14 is located within signal-inhibiting structure 16. In this circumstance structure 16 may hinder or even prohibit MS position determination through range measurements or through global positioning.

To overcome this limitation, a database, shown, for example, as the position location database (PLD) 110 in FIG. 1, of signal information associated with, or used to identify, particular base stations, repeater discriminants, and associated mobile station geographical position information, such as depicted in Table I, is created to allow the system to determine the geographical position of MS 14. This position location database (PLD) 110 resides on computer readable media communicatively coupled with the PDM of control center 10. Typically, there are a limited number of discriminants available for implementation at any given repeater. Therefore, a combination of base station signal information and discriminant information is used to provide position information for MS 14. If the received base station identification and repeater discriminant are known, then MS position can be determined through accessing the position location database 110.

TABLE I

| Base Station Identification | Repeater Discriminant | Position Information |
|---|---|---|
| A | 1 | $(x_0, y_0)$ |
| A | 2 | $(x_1, y_1)$ |
| A | 3 | $(x_2, y_2)$ |
| B | 1 | $(x_3, y_3)$ |
| θ | θ | θ |
| θ | θ | θ |

It will be understood by those skilled in the art that the manner of storing information related to base stations, repeater discriminants, and position, as well as the type of information stored, can take many forms and is not to be limited to any particular method of storage or type of information. For example, in the forward link, the base station identification may include base station pilot phase or pseudorandom noise (PN) time offset, conventionally used to distinguish different sectors or cells in a CDMA network; primary scrambling code (PSC), which identifies different sectors in a wideband CDMA (WCDMA) network; a particular frequency that identifies the base station in a GSM network; base station messaging, or any combination thereof. These same types of base station identifiers can be used to identify the base station in the reverse link. Position information may be, for example, a geographical longitude and latitude, and/or physical address, region and/or sub-regional information.

FIG. 4a provides an outline of a method of determining position information for MS 14 utilizing discriminant 34 implemented at repeater 18 of FIG. 2a in the forward link and position location database 110. Repeater 18 receives the signal transmitted in the forward link 42 from base station (BS) 12, or other repeater—if a repeater is encountered in the communication link between BS 12 and repeater 18. Repeater 18 processes the signal to include discriminant 34 having a signature associated with repeater 44. After processing to include discriminant 34, repeater 18 transmits the processed signal 46. MS 14 receives the processed signal transmission 48, detects the discriminant 50, or lack of a discriminant, and associates this discriminant with a particular forward link signal source 52, or base station. As used herein, the term "detecting a discriminant" refers to detecting either the presence or absence of a discriminant. MS 14 then communicates which particular forward link signal source had which discriminant, or lack thereof, back to the PDM using the reverse link. Generally, this knowledge is communicated via messaging. With this information the PDM of control center 10 accesses position location database 110 (FIG. 1) to determine if the base station identification and discriminant information are presently stored in the position location database, along with associated position information 54. If so, the position information associated with the discriminant and base station is retrieved from the position location database 56 for MS 14.

FIG. 4b outlines an alternative method of determining position information utilizing discriminant 34 implemented at repeater 18 of FIG. 2b in the reverse link and position location database 110. In this method, repeater 18 receives the signal transmitted in the reverse link 58 from MS 14. Repeater 18 processes the signal to include discriminant 34 having a signature associated with repeater 60. After processing to include discriminant 34, repeater 18 transmits the processed signal 62. BS 12 receives the processed signal transmission 64 from repeater 18, or other repeater—if another repeater is encountered in the communication link between repeater 18 and BS 12, detects the discriminant 66, or lack of a discriminant, and associates it with a particular incoming signal source 68, or mobile station. The knowledge of which reverse link signal source had which discriminant, or lack thereof, is communicated to the PDM of control center 10, generally via messaging. With this information the PDM accesses the position location database 110 to determine if the base station identification and discriminant information are presently stored in the position location database 110 along with associated position information 70. If so, the position information associated with the discriminant and base station is retrieved from the position location database 72 for MS 14.

In either of the methods depicted in FIGS. 4a and 4b, database access takes place via processing means, such as via a computer or processor, and code, suitably communicatively coupled with a PDM and position location database 110 of control center 10. Such processor means reside at or near control center 10.

The methods depicted in FIGS. 4a and 4b can be combined whereby repeater 18 implements a discriminant 34 in both the forward and reverse links. (See FIG. 2c.) In this method the PDM accesses the position location database 110 based upon both forward and reverse link base station identifications and discriminants. Position information associated with the forward link discriminant and base station identification, as well as for the reverse link discriminant and base station identification, is retrieved from the position location database to determine position for MS 14. Position information obtained from the forward link and reverse link discriminants and base station identifications should coincide thereby confirming MS position. Alternatively, if either of the forward or reverse link signals is missing the discriminant and/or base station identification, then the other can be used to determine MS position.

While repeater 18 conventionally provides signal gain to a signal being transmitted between BS 12 and MS 14, the method and system described herein permits a repeater 80 having zero, or relatively small, gain. In such an embodiment, the repeater 80 (FIG. 5) serves primarily to implement discriminant 34 to the transmitted signal. As an example, one or more repeaters 80 of zero, or relatively small, gain can additionally be located at strategic locations or sub-regions within a region, such as a structure 16, shown in the communication system 200 of FIG. 5. The transmitted signals encounter repeater 82, typically located at the top of structure 16, which provides ample gain, but which may or may not implement an additional discriminant to the signal. In this embodiment each repeater 80 provides a unique discriminant to the transmitted signal to indicate a particular sub-region. The embodiment depicted in FIG. 5 serves to provide a more precise location for MS 14, such as the sub-region or floor of the structure 16 where MS 14 is located. In this embodiment position location database 110 provides not only a geographic position, but also a sub-region within a region, or structure, where MS 14 is located.

The embodiment of FIG. 5 can also be implemented in either the forward or reverse links in a similar manner as described above. FIG. 6a provides an outline of a method of determining position information for MS 14 utilizing discriminants 34 implemented at repeaters 80 in the forward link. Repeater 80 receives the signal transmitted in the forward link 84 from BS 12, or other repeater, such as repeater 82—if a repeater is encountered in the communication link between base station 12 and repeater 80. Repeater 80 processes the signal to include discriminant 34 having a signature associated with repeater 86. After processing to include discriminant 34, repeater 80 transmits the processed signal 88. MS 14 receives the processed signal transmission 90, detects the discriminant 92, or lack of a discriminant, and associates this discriminant with a particular forward link signal source 94, or base station. MS 14 then communicates which particular forward link signal source had which discriminant, or lack thereof, back to the PDM using the reverse link. Generally, this knowledge is communicated via messaging. With this information the PDM of control center 10 accesses position location database 110 (FIG. 5) to determine if the base station identification and discriminant information are presently stored in the position location database along with associated position information 96. If so, the position information associated with the discriminant and base station identification is retrieved from the position location database 98 for MS 14, where position information includes not only a regional position, but also a sub-regional position where MS 14 is located.

FIG. 6b outlines an alternative method of determining position information utilizing discriminant 34 implemented at repeaters 80 in the reverse link. In this method, repeater 80 receives the signal transmitted in the reverse link 112 from MS 14. Repeater 80 processes the signal to include discriminant 34 having a signature associated with repeater 114. After processing to include discriminant 34, repeater 18 transmits the processed signal 116 to BS 12, or other repeater, such as repeater 82—if a repeater is encountered in the communication link between repeater 80 and BS 12. BS 12 receives the processed signal transmission 118, from repeater 80, or repeater 82, detects the discriminant 120, or lack of a discriminant, and associates it with an incoming signal source 122, or mobile station. This knowledge of which reverse link signal source had which discriminant, or lack thereof, is communicated to the PDM of control center 10, generally via messaging. With this information the PDM of control center 10 accesses position location database 110 to determine if the base station identification and discriminant information are presently stored in the position location database along with associated position information 124. If so, the position information associated with the discriminant and base station is retrieved from the position location database 126 for MS 14, where position information includes not only a regional position, but also a sub-regional position where MS 14 is located.

In either of the methods depicted in FIGS. 6a and 6b, database access takes place via processing means, such as via computer or processor, and code, suitably communicatively coupled with a PDM and position location database 110 of control center 10.

The methods depicted in FIGS. 6a and 6b can be combined whereby repeater 80 implements a discriminant 34 in both the forward and reverse links. (See FIG. 2c.) In this method the PDM accesses the position location database 110 based upon both forward and reverse link base station identifications and discriminants. Position information associated with the forward link discriminant and base station identification, as well as for the reverse link discriminant and base station identification, is retrieved from the position location database to determine a regional and sub-regional position for MS 14. Position information obtained from the forward link and reverse link discriminants and base station identifications should coincide thereby confirming MS position. Alternatively, if either of the forward or reverse link signals is missing the discriminant and/or base station identification, then the other can be used to determine MS position.

As used herein, repeaters 18, 80 may include terrestrially-based repeaters, atmospherically deployed repeaters, or repeaters disposed on satellites in geosynchronous (GEO), Middle-Earth Orbits (MEO), Low-Earth Orbits (LEO). Repeaters may also be fixed or mobile.

As described in detail in U.S. patent application Ser. No. 10/004,177 entitled, "Method and System for Identifying Repeater Traffic in a Code Division Multiple Access System," and U.S. patent application Ser. No. 10/316,780 entitled, "Method and System for Identifying and Monitoring Repeater Traffic in a Code Division Multiple Access System," as follows, implementation of the discriminant in the method and system herein can be accomplished in a variety of ways.

The method and system herein is not limited to embodiments wherein a signal characteristic, or discriminant, is added to the transmission signal. The discriminant could also be implemented by a system in which the repeater removes rather than adds the signal characteristic (e.g. the signal directly from the mobile stations 14 may include a modulation, delay or other information that is removed by the repeater before transmission). However, even in this case, the signal passing through the repeater 18, 80 is augmented with a discriminant, where the discriminant is now the absence of the modulation that other received signals are expected to have.

The discriminant can take many different forms. In one embodiment, the discriminant is a code. The code may be added to the base signal or information (e.g. by receiving and demodulating the signal received in the repeater from the mobile station, adding the code, re-modulating and transmitting the signal with the added code to the base station), or may be added to the modulated signal itself rather than the demodulated signal. In another embodiment, the discriminant comprises an in-band tone.

In another embodiment, the discriminant is a modulation that is applied to the signal received at the repeater from the mobile station without the demodulation of the received signal. The modulation can be amplitude modulation (AM) (e.g. small perturbations to the return link carrier amplitude), phase modulation frequency modulation (FM) (e.g. small perturbations in the return link carrier frequency), pulse modulation, delay modulation (DM), or any combination of such modulation techniques. Exemplary modulation techniques suitable for application with spread spectrum transmissions are discussed in "Spread Spectrum Communications Handbook," by Marvin K. Simon et al. (revised edition, 1994, ISBN 0-07-057629-7), pp. 11-12.

In another embodiment, the discriminant is a modulation that is applied to the signal received at the repeater from the mobile station without the demodulation of the received signaL The modulation can be amplitude modulation (AM) (e.g. small perturbations to the return link carrier amplitude), phase modulation, frequency modulation (FM) (e.g. small perturbations in the return link carrier frequency), pulse modulation, delay modulation (DM), or any combination of such modulation techniques. Exemplary modulation techniques suitable for application with spread spectrum transmissions are discussed in "Spread Spectrum Communications Handbook,"by Marvin K. Simon et al. (revised edition, 1994, ISBN 0-07-057629-7), pp. 11-12.

FIG. 8 is a block diagram of an embodiment of a repeater 300 in accordance with the method and system described herein. Repeaters described in the method and system herein, 18 and 80, can be embodied as repeater 300. An add-on device 310 communicatively coupled to the amplifiers 308 and 306 and the donor antenna 302 adds the discriminant. This modification can be accomplished without modification to any of the elements shown in FIG. 7. In one embodiment, the add-on device 310 adds modulation (AM, PM, DM, FM or equivalent) to the return link signal to the base station 12. In another embodiment the add-on device 310' adds modulation, i.e., implements the discriminant, to the forward link signal to the base station. Optionally, a device or devices, 310, 310', could implement a discriminant or discriminants in both the forward and reverse links, as shown in FIG. 8.

FIG. 9 is a diagram presenting an implementation of the discriminant described herein employing AM modulation. In this embodiment, the device 310 is a simple switching device 502 allowing the return link to be connected to either the donor antenna 302 or a load 504.

FIG. 10 is a diagram presenting an implementation of the discriminant described herein employing delay modulation. In this embodiment, the switching device 502 applies the output of the amplifier 306 directly to the server antenna 302 or via a delay line device 602. In the embodiments illustrated in FIG. 9 and FIG. 10, only the return link would be modulated as indicated.

The step of processing the received signal to include a discriminant having a signature associated with the repeater can be performed in a variety of ways. The received signal can be augmented and/or modified with the discriminant. As set forth in greater detail below, the discriminant can take the form of a one or more delay components that are alternately selected or individually temporally variant such that the sum of the power of the signals (and hence, the discriminant) is temporally constant (of course, the use of other discriminants, e.g. FM and code discriminants, obviate the need for substantially constant power output). Discriminants utilizing AM will not have constant output power by definition. Such delay modulation discrimination can be applied in forward link communications through the repeater, reverse link communications through the repeater, or to both forward and reverse link communications.

The discriminant can also include a signature. For example, the discriminant signature can be the delay of each of the delay components, the period between which the delay components are switched from one to the other, or the contribution of each delay component to the total signal power.

FIG. 11 is a block diagram of another embodiment of the repeater 400 of the method and system described herein. Repeaters described in the method and system herein, 18 and 80, can be embodied as repeater 400. In the illustrated embodiment, the repeater 400 comprises a server antenna 304 communicatively coupled to a transceiver 424. The transceiver 424 includes a receiver for receiving one or more transmissions (each of which is typically associated with a call either originating or directed to one of the mobile stations) sensed by the server antenna 304 and a transmitter for transmitting information provided from the communicatively coupled second transceiver 426. In the illustrated embodiment, the transceiver 424 includes a duplexer 404 for converting simplex communications into duplex communications, and an amplifier 418 for amplifying the signal provided by the second transceiver 426. The foregoing can be implemented with separate transmit and receive antennas as well, in which case, the duplexers 404, 416 may be omitted.

The first transceiver 424 is communicatively coupled to a discriminant processor 422. The discriminant processor accepts the received signal and processes the received signal to include a discriminant having a signature associated with the repeater. The discriminant processor 422 is communicatively coupled to the second transceiver 426. The second transceiver 426 includes a receiver and a transmitter, and accepts a signal from the discriminant processor 422 and transmits the signal via the donor antenna 302. The second transceiver 426 also receives signals sensed by the donor antenna 302, and provides the received signals to the first transceiver 424, for transmission via the server antenna 304.

The input to the discriminant processor 422 is selectively provided to a first delay element 410 and a second delay element via a switch 420, and thereafter to a combiner 412. The combiner 412 also accepts and combines the input to the discriminant processor 422 via a direct signal path 406, thus providing, at the output of the combiner, the input to the discriminant processor (via the direct signal path 406) and the input signal delayed by either $\tau_1$ or $\tau_2$ seconds.

The output of the combiner 412 is communicatively coupled to the second transceiver 426. The signal provided is then amplified by the amplifier 414 in the second transceiver 426 and provided to the donor antenna 302 for transmission. It will be understood by those skilled in the art that the discriminant can be implemented in either or both the forward and reverse links via the repeater of FIG. 11.

FIG. 12 is a diagram illustrating one embodiment of a signal transmitted by the second transceiver 426 depicted in FIG. 11. The horizontal axis depicts time, and in embodiments employing code division multiple access (CDMA) techniques, such time can be represented by chips. The transmitted signal includes a direct component 510 (via the direct signal path 406) as well as a second component which is selected by the switch 420 to be either the first 512 or second 514 delay modulated components. In one embodiment, the first 512 and second 514 delay modulated components are alternately selected to provide the repeater signature, thus indicating not only that the signal was transmitted via the repeater, but also identifying which repeater was involved in the transmission.

Thus, by sampling and then delaying the entire return link envelope from the repeater by a few chips of time, the presence of a delayed signal can be used to mark the traffic as repeater traffic. As further described below, this delayed signal may be varied in a distinctive manner to permit identification at the cell station receiver (CSR) and not confused with natural multipath components. This reverse link signal and its perturbation would be visible at the finger tracking circuitry of the CSR and/or the searcher circuitry.

Typically, cellular telephone systems include elements which allow the control station(s) 10 or the base station(s) 12 to control the transmitted power of the mobile, or "remote" stations 14. Such power control subsystems prevent remote stations 14 that are disposed close to a particular base station 12 from overpowering signals from other remote stations are further away from the base station. While the aforementioned delay modulation technique provides an efficient discriminant with a signature allowing the repeater to be defined, the consequential abrupt switching between delay components can cause problems with the power control subsystem. Consequently, it is beneficial to avoid abrupt switching between the delay components $\tau 1$ and $\tau 2$.

Typically, cellular telephone systems include elements which allow the control station(s) 10 or the base station(s) 12 to control the transmitted power of the mobile, or "remote" stations 14. Such power control subsystems prevent remote stations 14 that are disposed close to a particular base station 12 from overpowering signals from other remote stations that are further away from the base station. While the aforementioned delay modulation technique provides an efficient discriminant with a signature allowing the repeater to be defined, the consequential abrupt switching between delay components can cause problems with the power control subsystem. Consequently, it is beneficial to avoid abrupt switching between the delay components $\tau 1$ and $\tau 2$.

The gain of the amplifiers 606 and 610 (and hence, the contribution of input signal after processing by each of the delay elements) can be adjusted by the gain controllers 604 and 612 in many ways, so long as the output power of the signal provided by the second transceiver 426 adequately controlled.

FIG. 14 is a diagram showing an exemplary control signals provided by the gain controllers 604 and 612. In the illustrated example, the gain of both amplifiers 606 and 610 are controlled according to control signals 702 and 704 having a sawtooth or triangular shape. One of the control signals (e.g. control signal 704) is 180 degrees (or $\pi$ radians) out of phase with the other. The result is that the sum of the delayed outputs of the two amplifiers 606 and 610 is substantially constant, and hence, the output of the combiner 412 and hence the second transceiver 426 is substantially constant as well.

Using the non-abrupt transition described above, delay components (such as those that are disclosed in FIG. 12) transition gracefully from one delay offset to the other (e.g. the delay component at time offset $\tau 1$ would begin to disappear while the delay component at time offset $\tau 2$ begins to appear). In addition to ameliorating some of the problems abrupt transitions would have on the power control system of a cellular telephone system, this also allows the discriminant signal and it's signature to be more easily tracked by the base station.

The term "substantially", when used in this context, refers to that amount of constancy that is required so as to not create objectionable power variations that adversely impact the performance of the power control system of a cellular telephone system. Further, in FIGS. 11 and 12, two delay components ($\tau 1$ and $\tau 2$) were used to illustrate the principles of the method and system herein. The method and system described herein can also be implemented with one or more delay components (e.g. $\tau 1, \tau 2, \ldots, \tau n$) as desired. If FM modulation, rather than delay modulation is employed, the output power of the reverse link will be substantially constant without controlling the amplifiers 606 and 610 with waveforms such as those described in FIG. 14.

FIGS. 15-17 are diagrams illustrating repeater 210 configurations that can be used in conjunction with the method and system described herein. FIG. 15 presents a basic repeater configuration with respect to the orientation relative to mobile station 14, the base station 12, and the repeater 210. In the embodiment illustrated in FIG. 15, the donor antenna 302 is directed at the base station 12 (or multiple base stations), while the server antenna 304 is generally directed at the mobile station 14.

FIG. 16 is a diagram showing a repeater configuration in which the link from a repeater 800 to the base station 12 is accomplished via a landline 802 such as a coaxial or fiber optic cable.

FIG. 17 is a diagram showing a repeater configuration in which the server antenna 902 is not a single antenna, but a plurality of antennae 902A, 902B distributed in a plurality of locations. For example, the antennae 902A, 902B could be disposed on different floors of a building or along the length of a subway tunnel. The connection back to the base station 12 could be via land link (as shown in FIG. 16) or via a radio link (or optical link) as shown in FIG. 15.

FIG. 18 shows an embodiment of base station 12 elements which distinguish signals received from the mobile station 14 via a repeater 300 from signals received directly of the base station 12. In the illustrated embodiment, the discriminant is an amplitude modulation applied to the signal from the repeater 300.

The base station 12 includes a power control system 1002. The power control system 1002 is used to adjust the transmitter power of the mobile station 14. This adjustment prevents mobile stations 14 disposed in close proximity to the repeater and/or the base station from overwhelming transmissions from mobile stations that are disposed at a greater distance. It also allows the system to increase the power of mobile stations 14 that are remote from the base station 12, thus increasing range.

The power control system 1002 accepts the received signal 1004. The received signal 1004 can be received either directly from the mobile station 14 (via return link 220B) or from mobile station 14 or via the repeater 300. Signals received directly from mobile station 14 do not include a discriminant 1024, and may look like element 1004A in FIG. 18. Signals received from the mobile station 14 via the repeater include a discriminant (such as element 1024 of FIG. 18), and may appear as shown in element 1004B.

The received signal 1004 is provided to a power measuring device 1006, and a measurement 1008 indicative of the power or quality of service (QoS) of the received signal is generated. This can be a power measurement, an indication of a bit error rate (BER), or any other measurement that is an indication of the proximity of the mobile station 14 and/or the potential of that signal to be lost due to insufficient transmit characteristics (power, etc.) or to interfere with signals received from other mobile stations 14.

The measured power 1008 is compared to a desired power value 1012 which is obtained from a reference 1010. A difference between the measured power and the reference or desired power is obtained by a device (represented in FIG. 18 by summing junction 1014) and provided to a signal processor 1016. The signal processor 1016 determines whether a change in the transmit power of the mobile station 14 is required, and if so, generates either a new power level command or a command describing a change in the power level. That command is transmitted to the mobile station via link 220A or 222A or by an independent link.

An error signal 1020 generated by the processor 1016 is provided to a detection module 1022. The detection module 1022 examines the error signal to determine whether the discriminant 1024 is included in the received signal. This allows a determination as to whether the received signal 1004 was received in the base station 12 via a repeater or directly from a mobile station 14. If the detection module 1022 determines that the discriminant (e.g. modulation) on the received signal was added by a repeater, a determination is made that the signal was received from a mobile station 14 via the repeater, and appropriate processing (for position determination, traffic analysis, or other purposes) can take place. Further, if the detection module determines that the variations in the received signal 1004 were added by the repeater, the detection module 1022 can inform the processor 1016 of this fact so a new power command will not be generated. Alternatively, the frequency or amplitude of the discriminant 1024 can be such that the power control system 1002 does not supply a power control signal (e.g. the frequencies of the added discriminant is sufficiently attenuated by the closed loop response of the power control system 1002 so that the power command is effectively non-existent or negligible). Although illustrated as a separate device to indicate functionality, the detection module may be implemented in the processor 1016 as well.

Power is just one example of many different mobile station transmitter characteristics that may be controlled by the base station 12 to optimize system communications. Other examples include packet size and message bandwidth. As such, the technique of adding a discriminant to signals received and repeated by the repeater can be implemented in a variety of embodiments, including those explicitly set forth above and equivalents thereof.

The foregoing ability to sense discriminants applied by the repeater in the forward link by the remote station 14 and the base station 12 without applying a specific reverse link discriminant (or the ability to sense certain discriminants applied to the reverse link signal passing through the repeater by both the base station 12 and the remote station 14 without applying a specific forward link discriminant) can be applied with other (e.g. non-power control related) discriminant types. For example, if the repeater adjusts the carrier frequency on the forward link (e.g. by providing a small offset in frequency), the receiver in the remote station 14 will track this. This capability (which is used, for example, to track Doppler shifts) is present in many existing remote stations 14. This received frequency offset provides the remote station 14 with a discriminant with which to identify the repeater.

The remote station 14 includes a receiver local oscillator (LO) and a transmitter LO which operates at a frequency based on the receiver LO's frequency. As the remote station 14 receiver tracks the frequency shifts from the repeater, these shifts will appear on the remote station transmitter. Hence, a discriminant is placed onto the reverse link and can be detected at the base station receiver.

FIG. 19 shows an embodiment of base station 12 elements which distinguish signals received from the remote station 14 via a repeater from signals received directly from the remote station 14. The base station 12 includes a first transceiver 1102 comprising a receiver and a transmitter for transceiving signals with either of remote stations 14, 14' or the repeater 18 or 80. The base station 104 also includes a processor 1104 communicatively coupled to the transceiver 1102, and a second transceiver 1106 communicatively coupled to the processor 1104. The second transceiver 1106 also includes a receiver and a transmitter.

The processor 1104 identifies received transmissions, some of which include the repeater-applied discriminant, and designates such received signal transmissions as being transmitted via the repeater 18 or 80. The processor 1104 also associates the designated signal characteristic with one or more of the monitoring characteristics described above. The processor 1104 may be a special purpose processor, specially designed hardware circuitry, or a combination of both, including both software and hardware modules.

FIG. 20 is a diagram illustrating a computer system 1200 that may be used to implement the processor 1104 and other elements of the method and system described herein. The computer system 1200 comprises a computer 1202, including a computer processor 1204 and a memory, such as random access memory (RAM) 1206. The computer 1202 may be operatively coupled to a display 1222, which presents images such as windows to the user on a graphical user interface 1218B. The computer 1202 may also be coupled to other devices, such as a keyboard 1214, a mouse device 1216, a printer, etc. Any combination of the above components, or any number of different components, peripherals, and other devices, may be used with the computer 1202.

Generally, the computer 1202 operates under control of an operating system (OS) 1208 stored in the memory 1206, and interfaces with the user to accept inputs and commands and to present results through a graphical user interface (GUI) module 1218A. Although the GUI module 1218A is depicted as a separate module, the instructions performing the GUI functions can be resident or distributed in the operating system 1208, the computer program 1210, or implemented with special purpose memory and processors. The computer 1202 also implements a compiler 1212 which allows an application program 1210 written in a programming language such as COBOL, C++, FORTRAN, or other language to be translated into processor 1204 readable code. After completion, the application 1210 accesses and manipulates data stored in the memory 1206 of the computer 1202 using the relationships and logic that was generated using the compiler 1212. The computer 1202 also optionally comprises an external communication device such as a modem, satellite link, Ethernet card, or other device for communicating with other computers.

In one embodiment, instructions implementing the operating system 1208, the computer program 1210, and the compiler 1212 are tangibly embodied in a computer-readable medium, e.g., data storage device 1220, which could include one or more fixed or removable data storage devices, such as a zip drive, floppy disc drive 1224, hard drive, CD-ROM drive, tape drive, etc. Further, the operating system 1208 and the computer program 1210 are comprised of instructions which, when read and executed by the computer 1202, causes the computer 1202 to perform the steps necessary to implement and/or use the method and system described herein. Computer program 1210 and/or operating instructions may also be tangibly embodied in memory 1206 and/or data communications devices 1230, thereby making a computer program product or article of manufacture. As such, the terms "article of manufacture," "program storage device" and "computer program product" as used herein are intended to encompass a computer program accessible from any computer readable device or media.

The foregoing techniques and systems can also be applied to identify forward link transmissions (from the base station to the remote station) that are transmitted via a repeater as well.

The foregoing description illustrates exemplary implementations, and novel features, of a method and system for determining mobile station position. There are many aspects to this method and system, because it may involve interaction between numerous components of a communications system. While some suggestions are provided for alternative uses and implementations of the method and system, it is of course not practical to exhaustively list or describe such alternatives. Accordingly, the scope of the method and system should be determined only by reference to the appended claims, and should not otherwise be limited by features illustrated herein except insofar as such limitation is recited in an appended claim.

While the above description has pointed out novel features of the disclosed method and system, the skilled person will understand that various omissions, substitutions, and changes in the form and details of the methods and systems illustrated may be made without departing from the scope of the method and system described herein. For example, the skilled person will be able to adapt the details described herein to communications systems having a wide range of modulation techniques, transmitter and receiver architectures, and generally any number of different formats.

Each practical and novel combination of the elements described hereinabove, and each practical combination of equivalents to such elements, is contemplated as an embodiment of the method and system for determining mobile station position. Partly because many more element combinations are contemplated as embodiments than can reasonably be explicitly enumerated herein, the scope of the method and system for determining mobile station position is properly defined by the appended claims rather than by the foregoing description. Furthermore, any operable possible combination of features described above should be considered as having been expressly and explicitly disclosed herein. All variations coming within the meaning and range of equivalency of the various claim elements are embraced within the scope of the corresponding claim. To this end, each described element in each claim should be construed as broadly as possible, and moreover should be understood to encompass any equivalent to such element insofar as possible without also encompassing the prior art.

The invention claimed is:

1. A method of determining initial position information for a mobile station comprising:
   receiving amplified modified signals from the mobile station, wherein the amplified modified signals from the mobile station include a discriminant applied by a sub-regional repeater in communication with the mobile station, the sub-regional repeater configured to apply the discriminant and transmit the signal from the mobile station with little or no amplification to a regional repeater configured to amplify the modified signals;
   accessing position information of the sub-regional repeater using the discriminant; and
   determining the initial position information for the mobile station using the position information of the sub-region repeater.

2. The method of claim 1, wherein the amplified modified signals from the mobile station further include a different discriminant applied by the regional repeater, and further comprising:
   accessing position information of the regional repeater using the different discriminant; and
   wherein determining the initial position information for the mobile station comprises determining the initial position information for the mobile station using the position information of the sub-region repeater and the position information of the regional repeater.

3. The method of claim 1 wherein the discriminant comprises a code.

4. The method of claim 1 wherein the discriminant comprises an in-band tone.

5. The method of claim 1 wherein the discriminant comprises power control information.

6. The method of claim 1 wherein the discriminant comprises a modulation applied to the signal transmission.

7. The method of claim 6 wherein the modulation comprises one of phase modulation and frequency modulation.

8. The method of claim 6 wherein the modulation comprises delay modulation.

9. The method of claim 6 wherein the modulation comprises amplitude modulation.

10. A method of determining initial position information for a mobile station comprising:
    receiving at the mobile station signals from a base station, wherein the received signals have been amplified by a regional repeater and include a discriminant applied by a sub-regional repeater in communication with the mobile station, the sub-regional repeater configured to apply the discriminant and transmit the signal from the mobile station with little or no amplification;
    accessing position information of the sub-regional repeater using the discriminant; and
    determining the initial position information for the mobile station using the position information of the sub-region repeater.

11. The method of claim 10, wherein the regional repeater applies a different discriminant, the method further comprising:
    accessing position information of the regional repeater using the different discriminant; and
    wherein determining the initial position information for the mobile station comprises determining the initial position information for the mobile station using the position information of the sub-region repeater and the position information of the regional repeater.

12. A sub-regional repeater comprising:
    a first antenna to receive amplified signal from a regional repeater, the regional repeater amplifying the signal with a first gain;
    a discriminant processor to modify the received amplified signal to include a discriminant indicative of an identification of the sub-regional repeater and generate a modified signal thereby; and
    a second antenna to transmit the modified signal, wherein the sub-regional repeater is configured to have a second gain substantially smaller than the first gain.

13. The sub-region repeater of claim 12 wherein the second gain corresponds to no amplification of the received amplified signal by the sub-region repeater.

14. A sub-regional repeater comprising:
    a second antenna to receive a signal from a mobile device;
    a discriminant processor to modify the received signal to include a discriminant indicative of an identification of the sub-region repeater and generate a modified signal thereby; and
    a first antenna to transmit the modified signal to a regional repeater having a first gain, wherein the sub-regional repeater is configured to have a second gain substantially smaller than the first gain.

15. The sub-regional repeater of claim 14 wherein the second gain corresponds to no amplification of the received amplified signal by the sub-region repeater.

16. An apparatus comprising:
    means for receiving amplified modified signals from the mobile station, wherein the amplified modified signals from the mobile station include a discriminant applied by a sub-regional repeater in communication with the mobile station, the sub-regional repeater configured to apply the discriminant and transmit the signal from the mobile station with little or no amplification to a regional repeater configured to amplify the modified signals;
    means for accessing position information of the sub-regional repeater using the discriminant; and
    means for determining the initial position information for the mobile station using the position information of the sub-region repeater.

17. The apparatus of claim 16, wherein the amplified modified signals from the mobile station further include a different discriminant applied by the regional repeater, and further comprising:
    means accessing position information of the regional repeater using the different discriminant; and
    wherein the means for determining the initial position information for the mobile station comprises means for determining the initial position information for the mobile station using the position information of the sub-region repeater and the position information of the regional repeater.

18. An apparatus comprising:
means for receiving at the mobile station signals from a base station, wherein the received signals have been amplified by a regional repeater and include a discriminant applied by a sub-regional repeater in communication with the mobile station, the sub-regional repeater configured to apply the discriminant and transmit the signal from the mobile station with little or no amplification;
means for accessing position information of the sub-regional repeater using the discriminant; and
means for determining the initial position information for the mobile station using the position information of the sub-region repeater.

19. The apparatus of claim 18, wherein the regional repeater applies a different discriminant, the apparatus further comprising:
means for accessing position information of the regional repeater using the different discriminant; and
wherein the means for determining the initial position information for the mobile station comprises means for determining the initial position information for the mobile station using the position information of the sub-region repeater and the position information of the regional repeater.

\* \* \* \* \*

UNITED STATES PATENT AND TRADEMARK OFFICE
CERTIFICATE OF CORRECTION

PATENT NO. : 7,590,383 B2 Page 1 of 1
APPLICATION NO. : 11/033597
DATED : September 15, 2009
INVENTOR(S) : Dean et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1068 days.

Signed and Sealed this

Twenty-first Day of September, 2010

David J. Kappos
*Director of the United States Patent and Trademark Office*